US008947941B2

(12) United States Patent
Steiner et al.

(10) Patent No.: US 8,947,941 B2
(45) Date of Patent: Feb. 3, 2015

(54) STATE RESPONSIVE OPERATIONS RELATING TO FLASH MEMORY CELLS

(75) Inventors: Avi Steiner, Kiryat Motzkin (IL); Hanan Weingarten, Herzelia (IL); Igal Maly, Tel Aviv (IL); Avigdor Segal, Netanya (IL)

(73) Assignee: Densbits Technologies Ltd., Haifa (IL)

( * ) Notice: Subject to any disclaimer, the term of this patent is extended or adjusted under 35 U.S.C. 154(b) by 337 days.

(21) Appl. No.: 13/369,834

(22) Filed: Feb. 9, 2012

(65) Prior Publication Data

US 2013/0212315 A1    Aug. 15, 2013

(51) Int. Cl.
*G11C 11/34*    (2006.01)

(52) U.S. Cl.
USPC .................................... 365/185.33

(58) Field of Classification Search
USPC .................................... 365/185.33
See application file for complete search history.

(56) References Cited

U.S. PATENT DOCUMENTS

| | | |
|---|---|---|
| 4,430,701 A | 2/1984 | Christian et al. |
| 4,463,375 A | 7/1984 | Macovski |
| 4,584,686 A | 4/1986 | Fritze |
| 4,589,084 A | 5/1986 | Fling et al. |
| 4,777,589 A | 10/1988 | Boettner et al. |
| 4,866,716 A | 9/1989 | Weng |
| 5,003,597 A | 3/1991 | Merkle |
| 5,077,737 A | 12/1991 | Leger et al. |
| 5,297,153 A | 3/1994 | Baggen et al. |
| 5,305,276 A | 4/1994 | Uenoyama |
| 5,592,641 A | 1/1997 | Doyle et al. |
| 5,623,620 A | 4/1997 | Alexis et al. |
| 5,640,529 A | 6/1997 | Hasbun |
| 5,657,332 A | 8/1997 | Auclair et al. |
| 5,663,901 A | 9/1997 | Harari et al. |
| 5,724,538 A | 3/1998 | Morris et al. |
| 5,729,490 A | 3/1998 | Calligaro et al. |
| 5,740,395 A | 4/1998 | Wells et al. |
| 5,745,418 A | 4/1998 | Hu et al. |
| 5,778,430 A | 7/1998 | Ish et al. |
| 5,793,774 A | 8/1998 | Usui et al. |
| 5,920,578 A | 7/1999 | Zook et al. |
| 5,926,409 A | 7/1999 | Engh et al. |
| 5,933,368 A | 8/1999 | Hu et al. |
| 5,956,268 A | 9/1999 | Lee |
| 5,956,473 A | 9/1999 | Hu et al. |
| 5,968,198 A | 10/1999 | Balachandran et al. |
| 5,982,659 A | 11/1999 | Irrinki et al. |
| 6,011,741 A | 1/2000 | Harari et al. |
| 6,016,275 A | 1/2000 | Han |

(Continued)

OTHER PUBLICATIONS

Search Report of PCT Patent Application WO 2009/118720 A3.

(Continued)

*Primary Examiner* — Hoai V Ho
*Assistant Examiner* — Pablo Huerta
(74) *Attorney, Agent, or Firm* — Dentons US LLP

(57) ABSTRACT

A non-transitory computer readable medium, a flash controller and a method for state responsive encoding and programming; the method may include encoding an information entity by applying a state responsive encoding process to provide at least one codeword; wherein the state responsive encoding process is responsive to a state of flash memory cells; and programming the at least one codeword to at least one group of flash memory cells by applying a state responsive programming process that is responsive to the state, the state being either an estimated state or an actual state.

25 Claims, 11 Drawing Sheets

(56) References Cited

U.S. PATENT DOCUMENTS

| | | | |
|---|---|---|---|
| 6,038,634 A | 3/2000 | Ji et al. | |
| 6,081,878 A | 6/2000 | Estakhri et al. | |
| 6,094,465 A | 7/2000 | Stein et al. | |
| 6,119,245 A | 9/2000 | Hiratsuka | |
| 6,182,261 B1 | 1/2001 | Haller et al. | |
| 6,192,497 B1 | 2/2001 | Yang et al. | |
| 6,195,287 B1 | 2/2001 | Hirano | |
| 6,199,188 B1 | 3/2001 | Shen et al. | |
| 6,209,114 B1 | 3/2001 | Wolf et al. | |
| 6,259,627 B1 | 7/2001 | Wong | |
| 6,272,052 B1 | 8/2001 | Miyauchi | |
| 6,278,633 B1 | 8/2001 | Wong et al. | |
| 6,279,133 B1 | 8/2001 | Vafai et al. | |
| 6,301,151 B1 | 10/2001 | Engh et al. | |
| 6,370,061 B1 | 4/2002 | Yachareni et al. | |
| 6,374,383 B1 | 4/2002 | Weng | |
| 6,504,891 B1 | 1/2003 | Chevallier | |
| 6,532,169 B1 | 3/2003 | Mann et al. | |
| 6,532,556 B1 | 3/2003 | Wong et al. | |
| 6,553,533 B2 | 4/2003 | Demura et al. | |
| 6,560,747 B1 | 5/2003 | Weng | |
| 6,637,002 B1 | 10/2003 | Weng et al. | |
| 6,639,865 B2 | 10/2003 | Kwon | |
| 6,674,665 B1 | 1/2004 | Mann et al. | |
| 6,675,281 B1 | 1/2004 | Oh et al. | |
| 6,704,902 B1 | 3/2004 | Shinbashi et al. | |
| 6,751,766 B2 | 6/2004 | Guterman et al. | |
| 6,772,274 B1 | 8/2004 | Estakhri | |
| 6,781,910 B2 | 8/2004 | Smith | |
| 6,792,569 B2 | 9/2004 | Cox et al. | |
| 6,873,543 B2 | 3/2005 | Smith et al. | |
| 6,891,768 B2 | 5/2005 | Smith et al. | |
| 6,914,809 B2 | 7/2005 | Hilton et al. | |
| 6,915,477 B2 | 7/2005 | Gollamudi et al. | |
| 6,952,365 B2 | 10/2005 | Gonzalez et al. | |
| 6,961,890 B2 | 11/2005 | Smith | |
| 6,968,421 B2 | 11/2005 | Conley | |
| 6,990,012 B2 | 1/2006 | Smith et al. | |
| 6,996,004 B1 | 2/2006 | Fastow et al. | |
| 6,999,854 B2 | 2/2006 | Roth | |
| 7,010,739 B1 | 3/2006 | Feng et al. | |
| 7,012,835 B2 | 3/2006 | Gonzalez et al. | |
| 7,038,950 B1 | 5/2006 | Hamilton et al. | |
| 7,068,539 B2 | 6/2006 | Guterman et al. | |
| 7,079,436 B2 | 7/2006 | Perner et al. | |
| 7,149,950 B2 | 12/2006 | Spencer et al. | |
| 7,177,977 B2 | 2/2007 | Chen et al. | |
| 7,188,228 B1 | 3/2007 | Chang et al. | |
| 7,191,379 B2 | 3/2007 | Adelmann et al. | |
| 7,196,946 B2 | 3/2007 | Chen et al. | |
| 7,203,874 B2 | 4/2007 | Roohparvar | |
| 7,212,426 B2 | 5/2007 | Park et al. | |
| 7,287,118 B2* | 10/2007 | Chang et al. | 711/103 |
| 7,290,203 B2 | 10/2007 | Emma et al. | |
| 7,292,365 B2 | 11/2007 | Knox | |
| 7,301,928 B2 | 11/2007 | Nakabayashi et al. | |
| 7,315,916 B2 | 1/2008 | Bennett et al. | |
| 7,388,781 B2 | 6/2008 | Litsyn et al. | |
| 7,395,404 B2 | 7/2008 | Gorobets et al. | |
| 7,441,067 B2 | 10/2008 | Gorobets et al. | |
| 7,443,729 B2 | 10/2008 | Li et al. | |
| 7,450,425 B2 | 11/2008 | Aritome | |
| 7,454,670 B2 | 11/2008 | Kim et al. | |
| 7,466,575 B2 | 12/2008 | Shalvi et al. | |
| 7,533,328 B2 | 5/2009 | Alrod et al. | |
| 7,558,109 B2 | 7/2009 | Brandman et al. | |
| 7,593,263 B2 | 9/2009 | Sokolov et al. | |
| 7,610,433 B2 | 10/2009 | Randell et al. | |
| 7,613,043 B2 | 11/2009 | Cornwell et al. | |
| 7,619,922 B2 | 11/2009 | Li et al. | |
| 7,697,326 B2 | 4/2010 | Sommer et al. | |
| 7,706,182 B2 | 4/2010 | Shalvi et al. | |
| 7,716,538 B2 | 5/2010 | Gonzalez et al. | |
| 7,773,413 B2* | 8/2010 | Shalvi | 365/185.02 |
| 7,804,718 B2 | 9/2010 | Kim | |
| 7,805,663 B2 | 9/2010 | Brandman et al. | |
| 7,805,664 B1 | 9/2010 | Yang et al. | |
| 7,844,877 B2 | 11/2010 | Litsyn et al. | |
| 7,911,848 B2 | 3/2011 | Eun et al. | |
| 7,944,744 B2* | 5/2011 | Bryant-Rich | 365/185.03 |
| 7,961,797 B1 | 6/2011 | Yang et al. | |
| 7,975,192 B2 | 7/2011 | Sommer et al. | |
| 8,020,073 B2 | 9/2011 | Emma et al. | |
| 8,108,590 B2 | 1/2012 | Chow et al. | |
| 8,122,328 B2 | 2/2012 | Liu et al. | |
| 8,159,881 B2 | 4/2012 | Yang | |
| 8,190,961 B1 | 5/2012 | Yang et al. | |
| 8,213,229 B2* | 7/2012 | Wilson et al. | 365/185.11 |
| 8,250,324 B2 | 8/2012 | Haas et al. | |
| 8,300,823 B2 | 10/2012 | Bojinov et al. | |
| 8,305,812 B2 | 11/2012 | Levy et al. | |
| 8,327,246 B2 | 12/2012 | Weingarten et al. | |
| 8,407,560 B2 | 3/2013 | Ordentlich et al. | |
| 8,417,893 B2 | 4/2013 | Khmelnitsky et al. | |
| 2001/0034815 A1 | 10/2001 | Dugan et al. | |
| 2002/0063774 A1 | 5/2002 | Hillis et al. | |
| 2002/0085419 A1 | 7/2002 | Kwon et al. | |
| 2002/0154769 A1 | 10/2002 | Petersen et al. | |
| 2002/0156988 A1 | 10/2002 | Toyama et al. | |
| 2002/0174156 A1 | 11/2002 | Birru et al. | |
| 2003/0014582 A1 | 1/2003 | Nakanishi | |
| 2003/0065876 A1 | 4/2003 | Lasser | |
| 2003/0101404 A1 | 5/2003 | Zhao et al. | |
| 2003/0105620 A1 | 6/2003 | Bowen | |
| 2003/0177300 A1 | 9/2003 | Lee et al. | |
| 2003/0192007 A1 | 10/2003 | Miller et al. | |
| 2004/0015771 A1 | 1/2004 | Lasser et al. | |
| 2004/0030971 A1 | 2/2004 | Tanaka et al. | |
| 2004/0059768 A1 | 3/2004 | Denk et al. | |
| 2004/0080985 A1 | 4/2004 | Chang et al. | |
| 2004/0153722 A1 | 8/2004 | Lee | |
| 2004/0153817 A1 | 8/2004 | Norman et al. | |
| 2004/0181735 A1 | 9/2004 | Xin | |
| 2004/0203591 A1 | 10/2004 | Lee | |
| 2004/0210706 A1 | 10/2004 | In et al. | |
| 2005/0013165 A1 | 1/2005 | Ban | |
| 2005/0018482 A1 | 1/2005 | Cemea et al. | |
| 2005/0083735 A1 | 4/2005 | Chen et al. | |
| 2005/0117401 A1 | 6/2005 | Chen et al. | |
| 2005/0120265 A1 | 6/2005 | Pline et al. | |
| 2005/0128811 A1 | 6/2005 | Kato et al. | |
| 2005/0138533 A1 | 6/2005 | Le-Bars et al. | |
| 2005/0144213 A1 | 6/2005 | Simkins et al. | |
| 2005/0144368 A1 | 6/2005 | Chung et al. | |
| 2005/0169057 A1 | 8/2005 | Shibata et al. | |
| 2005/0172179 A1 | 8/2005 | Brandenberger et al. | |
| 2005/0213393 A1 | 9/2005 | Lasser | |
| 2005/0243626 A1 | 11/2005 | Ronen | |
| 2006/0059406 A1 | 3/2006 | Micheloni et al. | |
| 2006/0059409 A1 | 3/2006 | Lee | |
| 2006/0064537 A1 | 3/2006 | Oshima | |
| 2006/0101193 A1 | 5/2006 | Murin | |
| 2006/0195651 A1 | 8/2006 | Estakhri et al. | |
| 2006/0203587 A1 | 9/2006 | Li et al. | |
| 2006/0221692 A1 | 10/2006 | Chen | |
| 2006/0248434 A1 | 11/2006 | Radke et al. | |
| 2006/0268608 A1 | 11/2006 | Noguchi et al. | |
| 2006/0282411 A1 | 12/2006 | Fagin et al. | |
| 2006/0284244 A1 | 12/2006 | Forbes et al. | |
| 2006/0294312 A1 | 12/2006 | Walmsley | |
| 2007/0025157 A1 | 2/2007 | Wan et al. | |
| 2007/0063180 A1 | 3/2007 | Asano et al. | |
| 2007/0081388 A1 | 4/2007 | Joo | |
| 2007/0098069 A1 | 5/2007 | Gordon | |
| 2007/0103992 A1 | 5/2007 | Sakui et al. | |
| 2007/0104004 A1 | 5/2007 | So et al. | |
| 2007/0109858 A1 | 5/2007 | Conley et al. | |
| 2007/0124652 A1 | 5/2007 | Litsyn et al. | |
| 2007/0140006 A1 | 6/2007 | Chen et al. | |
| 2007/0143561 A1 | 6/2007 | Gorobets | |
| 2007/0150694 A1 | 6/2007 | Chang et al. | |
| 2007/0168625 A1 | 7/2007 | Cornwell et al. | |
| 2007/0171714 A1 | 7/2007 | Wu et al. | |
| 2007/0171730 A1 | 7/2007 | Ramamoorthy et al. | |

(56) References Cited

U.S. PATENT DOCUMENTS

| | | |
|---|---|---|
| 2007/0180346 A1 | 8/2007 | Murin |
| 2007/0223277 A1 | 9/2007 | Tanaka et al. |
| 2007/0226582 A1 | 9/2007 | Tang et al. |
| 2007/0226592 A1 | 9/2007 | Radke |
| 2007/0228449 A1 | 10/2007 | Takano et al. |
| 2007/0253249 A1 | 11/2007 | Kang et al. |
| 2007/0253250 A1 | 11/2007 | Shibata et al. |
| 2007/0263439 A1 | 11/2007 | Cornwell et al. |
| 2007/0266291 A1 | 11/2007 | Toda et al. |
| 2007/0271494 A1 | 11/2007 | Gorobets |
| 2007/0297226 A1 | 12/2007 | Mokhlesi |
| 2008/0010581 A1 | 1/2008 | Alrod et al. |
| 2008/0028014 A1 | 1/2008 | Hilt et al. |
| 2008/0049497 A1 | 2/2008 | Mo |
| 2008/0055989 A1 | 3/2008 | Lee et al. |
| 2008/0071951 A1* | 3/2008 | Horowitz et al. ............. 710/104 |
| 2008/0082897 A1 | 4/2008 | Brandman et al. |
| 2008/0092026 A1 | 4/2008 | Brandman et al. |
| 2008/0104309 A1 | 5/2008 | Cheon et al. |
| 2008/0112238 A1 | 5/2008 | Kim et al. |
| 2008/0116509 A1 | 5/2008 | Harari et al. |
| 2008/0126686 A1 | 5/2008 | Sokolov et al. |
| 2008/0127104 A1 | 5/2008 | Li et al. |
| 2008/0128790 A1 | 6/2008 | Jung |
| 2008/0130341 A1 | 6/2008 | Shalvi et al. |
| 2008/0137413 A1 | 6/2008 | Kong et al. |
| 2008/0137414 A1 | 6/2008 | Park et al. |
| 2008/0141043 A1 | 6/2008 | Flynn et al. |
| 2008/0148115 A1 | 6/2008 | Sokolov et al. |
| 2008/0158958 A1 | 7/2008 | Shalvi et al. |
| 2008/0159059 A1 | 7/2008 | Moyer |
| 2008/0162079 A1 | 7/2008 | Astigarraga et al. |
| 2008/0168216 A1 | 7/2008 | Lee |
| 2008/0168320 A1 | 7/2008 | Cassuto et al. |
| 2008/0181001 A1 | 7/2008 | Shalvi |
| 2008/0198650 A1 | 8/2008 | Shalvi et al. |
| 2008/0198652 A1 | 8/2008 | Shalvi et al. |
| 2008/0201620 A1 | 8/2008 | Gollub |
| 2008/0209114 A1 | 8/2008 | Chow et al. |
| 2008/0219050 A1 | 9/2008 | Shalvi et al. |
| 2008/0225599 A1 | 9/2008 | Chae |
| 2008/0250195 A1 | 10/2008 | Chow et al. |
| 2008/0263262 A1 | 10/2008 | Sokolov et al. |
| 2008/0282106 A1 | 11/2008 | Shalvi et al. |
| 2008/0285351 A1 | 11/2008 | Shlick et al. |
| 2008/0301532 A1 | 12/2008 | Uchikawa et al. |
| 2009/0024905 A1 | 1/2009 | Shalvi et al. |
| 2009/0027961 A1 | 1/2009 | Park et al. |
| 2009/0043951 A1 | 2/2009 | Shalvi et al. |
| 2009/0046507 A1 | 2/2009 | Aritome |
| 2009/0072303 A9 | 3/2009 | Prall et al. |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0113275 A1 | 4/2009 | Chen et al. |
| 2009/0125671 A1 | 5/2009 | Flynn |
| 2009/0132755 A1 | 5/2009 | Radke |
| 2009/0144598 A1 | 6/2009 | Yoon et al. |
| 2009/0144600 A1 | 6/2009 | Perlmutter et al. |
| 2009/0150599 A1 | 6/2009 | Bennett |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |
| 2009/0228761 A1 | 9/2009 | Perlmutter et al. |
| 2009/0240872 A1 | 9/2009 | Perlmutter et al. |
| 2009/0282185 A1 | 11/2009 | Van Cauwenbergh |
| 2009/0282186 A1 | 11/2009 | Mokhlesi et al. |
| 2009/0287930 A1 | 11/2009 | Nagaraja |
| 2009/0300269 A1 | 12/2009 | Radke et al. |
| 2009/0323942 A1 | 12/2009 | Sharon et al. |
| 2010/0005270 A1 | 1/2010 | Jiang |
| 2010/0025811 A1 | 2/2010 | Bronner et al. |
| 2010/0030944 A1 | 2/2010 | Hinz |
| 2010/0050053 A1* | 2/2010 | Wilson et al. .................. 714/773 |
| 2010/0058146 A1 | 3/2010 | Weingarten et al. |
| 2010/0064096 A1 | 3/2010 | Weingarten et al. |
| 2010/0088557 A1 | 4/2010 | Weingarten et al. |
| 2010/0091535 A1 | 4/2010 | Sommer et al. |
| 2010/0095186 A1 | 4/2010 | Weingarten |
| 2010/0110787 A1 | 5/2010 | Shalvi et al. |
| 2010/0115376 A1 | 5/2010 | Shalvi et al. |
| 2010/0122113 A1 | 5/2010 | Weingarten et al. |
| 2010/0124088 A1 | 5/2010 | Shalvi et al. |
| 2010/0131580 A1 | 5/2010 | Kanter et al. |
| 2010/0131806 A1 | 5/2010 | Weingarten et al. |
| 2010/0131809 A1 | 5/2010 | Katz |
| 2010/0131826 A1 | 5/2010 | Shalvi et al. |
| 2010/0131827 A1 | 5/2010 | Sokolov et al. |
| 2010/0131831 A1 | 5/2010 | Weingarten et al. |
| 2010/0146191 A1 | 6/2010 | Katz |
| 2010/0146192 A1 | 6/2010 | Weingarten et al. |
| 2010/0149881 A1 | 6/2010 | Lee et al. |
| 2010/0172179 A1 | 7/2010 | Gorobets et al. |
| 2010/0174853 A1 | 7/2010 | Lee et al. |
| 2010/0180073 A1 | 7/2010 | Weingarten et al. |
| 2010/0199149 A1 | 8/2010 | Weingarten et al. |
| 2010/0207789 A1* | 8/2010 | Nieminen ....................... 341/81 |
| 2010/0211724 A1 | 8/2010 | Weingarten |
| 2010/0211833 A1 | 8/2010 | Weingarten |
| 2010/0211856 A1 | 8/2010 | Weingarten |
| 2010/0241793 A1 | 9/2010 | Sugimoto et al. |
| 2010/0246265 A1 | 9/2010 | Moschiano et al. |
| 2010/0251066 A1 | 9/2010 | Radke |
| 2010/0253555 A1 | 10/2010 | Weingarten et al. |
| 2010/0257309 A1 | 10/2010 | Barsky et al. |
| 2010/0269008 A1 | 10/2010 | Leggette et al. |
| 2010/0293321 A1 | 11/2010 | Weingarten |
| 2010/0318724 A1 | 12/2010 | Yeh |
| 2011/0051521 A1 | 3/2011 | Levy et al. |
| 2011/0055461 A1 | 3/2011 | Steiner et al. |
| 2011/0080669 A1* | 4/2011 | Parthasarathy et al. ......... 360/49 |
| 2011/0093650 A1 | 4/2011 | Kwon et al. |
| 2011/0096612 A1 | 4/2011 | Steiner et al. |
| 2011/0099460 A1 | 4/2011 | Dusija et al. |
| 2011/0119562 A1 | 5/2011 | Steiner et al. |
| 2011/0138104 A1* | 6/2011 | Franceschini et al. ........ 711/103 |
| 2011/0153919 A1 | 6/2011 | Sabbag |
| 2011/0161775 A1 | 6/2011 | Weingarten |
| 2011/0194353 A1 | 8/2011 | Hwang et al. |
| 2011/0209028 A1 | 8/2011 | Post et al. |
| 2011/0214029 A1 | 9/2011 | Steiner et al. |
| 2011/0214039 A1 | 9/2011 | Steiner et al. |
| 2011/0246792 A1 | 10/2011 | Weingarten |
| 2011/0246852 A1 | 10/2011 | Sabbag |
| 2011/0252187 A1 | 10/2011 | Segal et al. |
| 2011/0252188 A1 | 10/2011 | Weingarten |
| 2011/0271043 A1 | 11/2011 | Segal et al. |
| 2011/0302428 A1 | 12/2011 | Weingarten |
| 2012/0001778 A1 | 1/2012 | Steiner et al. |
| 2012/0005554 A1 | 1/2012 | Steiner et al. |
| 2012/0005558 A1 | 1/2012 | Steiner et al. |
| 2012/0005560 A1 | 1/2012 | Steiner et al. |
| 2012/0008401 A1 | 1/2012 | Katz et al. |
| 2012/0008414 A1 | 1/2012 | Katz et al. |
| 2012/0017136 A1 | 1/2012 | Ordentlich et al. |
| 2012/0051144 A1 | 3/2012 | Weingarten et al. |
| 2012/0063227 A1 | 3/2012 | Weingarten et al. |
| 2012/0066441 A1 | 3/2012 | Weingarten |
| 2012/0110250 A1 | 5/2012 | Sabbag et al. |
| 2012/0124273 A1* | 5/2012 | Goss et al. .................... 711/103 |
| 2012/0216085 A1* | 8/2012 | Weingarten et al. .......... 714/718 |
| 2012/0239976 A1* | 9/2012 | Cometti et al. .................. 714/24 |
| 2012/0246391 A1 | 9/2012 | Meir et al. |
| 2012/0320672 A1* | 12/2012 | Meir et al. ................ 365/185.03 |
| 2013/0007380 A1* | 1/2013 | Seekins et al. ................. 711/154 |
| 2013/0179754 A1* | 7/2013 | Cherubini et al. ............. 714/773 |
| 2013/0326284 A1* | 12/2013 | Losh et al. .................... 714/47.2 |

(56) References Cited

OTHER PUBLICATIONS

Search Report of PCT Patent Application WO 2009/095902 A3.
Search Report of PCT Patent Application WO 2009/078006 A3.
Search Report of PCT Patent Application WO 2009/074979 A3.
Search Report of PCT Patent Application WO 2009/074978 A3.
Search Report of PCT Patent Application WO 2009/072105 A3.
Search Report of PCT Patent Application WO 2009/072104 A3.
Search Report of PCT Patent Application WO 2009/072103 A3.
Search Report of PCT Patent Application WO 2009/072102 A3.
Search Report of PCT Patent Application WO 2009/072101 A3.
Search Report of PCT Patent Application WO 2009/072100 A3.
Search Report of PCT Patent Application WO 2009/053963 A3.
Search Report of PCT Patent Application WO 2009/053962 A3.
Search Report of PCT Patent Application WO 2009/053961 A3.
Search Report of PCT Patent Application WO 2009/037697 A3.
Yani Chen, Keshab K. Parhi, "Small Area Parallel Chien Search Architectures for Long BCH Codes", Ieee Transactions on Very Large Scale Integration(VLSI) Systems, vol. 12, No. 5, May 2004.
Yuejian Wu, "Low Power Decoding of BCH Codes", Nortel Networks, Ottawa, Ont., Canada, in Circuits and systems, 2004. ISCAS '04. Proceeding of the 2004 International Symposium on Circuits and Systems, published May 23-26, 2004, vol. 2, pp. II-369-72 vol. 2.
Michael Purser, "Introduction to Error Correcting Codes", Artech House Inc., 1995.
Ron M. Roth, "Introduction to Coding Theory", Cambridge University Press, 2006.
Akash Kumar, Sergei Sawitzki, "High-Throughput and Low Power Architectures for Reed Solomon Decoder", (a.kumar at tue.nl, Eindhoven University of Technology and sergei.sawitzki at philips.com).
Todd K.Moon, "Error Correction Coding Mathematical Methods and Algorithms", A John Wiley & Sons, Inc., 2005.
Richard E. Blahut, "Algebraic Codes for Data Transmission", Cambridge University Press, 2003.
David Esseni, Bruno Ricco, "Trading-Off Programming Speed and Current Absorption in Flash Memories with the Ramped-Gate Programming Technique", Ieee Transactions on Electron Devices, vol. 47, No. 4, Apr. 2000.
Giovanni Campardo, Rino Micheloni, David Novosel, "VLSI-Design of Non-Volatile Memories", Springer Berlin Heidelberg New York, 2005.
John G. Proakis, "Digital Communications", 3rd ed., New York: McGraw-Hill, 1995.
J.M. Portal, H. Aziza, D. Nee, "EEPROM Memory: Threshold Voltage Built in Self Diagnosis", ITC International Test Conference, Paper 2.1.
J.M. Portal, H. Aziza, D. Nee, "EEPROM Diagnosis Based on Threshold Voltage Embedded Measurement", Journal of Electronic Testing: Theory and Applications 21, 33-42, 2005.
G. Tao, A. Scarpa, J. Dijkstra, W. Stidl, F. Kuper, "Data retention prediction for modern floating gate non-volatile memories", Microelectronics Reliability 40 (2000), 1561-1566.
T. Hirncno, N. Matsukawa, H. Hazama, K. Sakui, M. Oshikiri, K. Masuda, K. Kanda, Y. Itoh, J. Miyamoto, "A New Technique for Measuring Threshold Voltage Distribution in Flash EEPROM Devices", Proc. IEEE 1995 Int. Conference on Microelectronics Test Structures, vol. 8, Mar. 1995.
Boaz Eitan, Guy Cohen, Assaf Shappir, Eli Lusky, Amichai Givant, Meir Janai, Ilan Bloom, Yan Polansky, Oleg Dadashev, Avi Lavan, Ran Sahar, Eduardo Maayan, "4-bit per Cell NROM Reliability", Appears on the website of Saifun.com.
Paulo Cappelletti, Clara Golla, Piero Olivo, Enrico Zanoni, "Flash Memories", Kluwer Academic Publishers, 1999.
JEDEC Standard, "Stress-Test-Driven Qualification of Integrated Circuits", JEDEC Solid State Technology Association. JEDEC Standard No. 47F pp. 1-26.
Dempster, et al., "Maximum Likelihood from Incomplete Data via the EM Algorithm", Journal of the Royal Statistical Society. Series B (Methodological), vol. 39, No. 1 (1997), pp. 1-38.
Mielke, et al., "Flash EEPROM Threshold Instabilities due to Charge Trapping During Program/Erase Cycling", IEEE Transactions on Device and Materials Reliability, vol. 4, No. 3, Sep. 2004, pp. 335-344.
Daneshbeh, "Bit Serial Systolic Architectures for Multiplicative Inversion and Division over GF (2)", A thesis presented to the University of Waterloo, Ontario, Canada, 2005, pp. 1-118.
Chen, Formulas for the solutions of Quadratic Equations over GF (2), IEEE Trans. Inform. Theory, vol. IT-28, No. 5, Sep. 1982, pp. 792-794.
Berlekamp et al., "On the Solution of Algebraic Equations over Finite Fields", Inform. Cont. 10, Oct. 1967, pp. 553-564.

\* cited by examiner

STATE RESPONSIVE OPERATIONS RELATING TO FLASH MEMORY CELLS

FIELD OF THE INVENTION

The present invention relates to flash memory cells and, more particularly, to state responsive operations relating to flash memory cells in which, for example, information is encoded through a process that is responsive to the state of the flash memory cells.

BACKGROUND

Many applications using flash memory require high read and write throughput performance. In order to achieve high read performance it is required to have an efficient implementation which minimizes the overhead associated with a read request. That is, for example, if a host needs to read in granularity of 512 B chunks and the data is encoded in larger chunks, then every read request will incur the penalty of reading more information from flash so that error correction code (ECC) decoding is possible, allowing reliable readout to the host. If the data is encoded at the granularity of the host the codeword can be too short to provide adequate reliability when the flash memory device ages.

FIG. 1 depicts a prior art system 8 that includes a flash memory controller 10 and a flash memory device 20 that includes multiple flash memory dies 20(0)-20(N). The flash memory controller 10 includes a read/write digital signal processor (DSP) 16 which usually adapts the read thresholds so as to minimize the readout errors, and a ECC module 12 which decodes the read-out data and passes it to the host through a management and host interface module 14.

On write commands, the management and host interface module 14 translates the host request to a physical block and page address of the flash memory device 20, and sends the data to the ECC module 12 for encoding; subsequently, the encoded data is written to the flash memory device 20 in the specified location. This prior art system 8 uses a single ECC configuration throughout the lifespan of the system 8.

FIG. 6 illustrates a prior art random read performance curve 60 of system 8. The performance is measured per program erase (PE) cycles.

Curve 60 starts by a horizontal portion 61 that is followed by a negative sloped portion 62. The horizontal portion 61 indicates that the read throughput is nearly constant during the start of life and until a meaningful retention occurs.

The negative sloped portion 62 represents degradation in the read throughput that increases with the number of P/E cycles, which is usually due to increased DSP operation overhead, and soft read outs from the flash device required as the error rate increases with the retention and P/E Cycles.

Accordingly, at higher wear levels the read performance is degraded since every read operation may include a DSP operation. The DSP 16 might have to search for the optimal thresholds for sampling, or might have to perform multiple reads, so as to provide the decoder a soft input to achieve full reliability.

At the end-of-life, i.e. near Cmax 66 the DSP 16 has to perform high resolution sampling to provide soft input, with high probability, since the input raw error bit rate (RBER) is usually at its maximal value on many pages.

There is a growing need to provide an optimized tradeoff between reliability and speed of flash memory programming operations.

SUMMARY OF THE INVENTION

According to an embodiment of the invention a method may be provided for state responsive operations relating to flash memory cells, the method may include encoding an information entity by applying a state responsive encoding process to provide at least one codeword; wherein the state responsive encoding process may be responsive to a state of flash memory cells; and programming the at least one codeword to at least one group of flash memory cells by applying a state responsive programming process that may be responsive to the state, the state being either an estimated state or an actual state.

The aggregate duration of the encoding and the programming is inversely proportional to a reliability level associated with the state.

The method may include selecting a length of each codeword in response to the state.

The length of each codeword is inversely proportional to a wear level of the flash memory cells.

The method may include selecting an interleaving scheme to be applied during the state responsive programming process in response to the state.

The method may include selecting between a non-interleaving option, an inter-flash memory die interleaving option and an intra-flash memory die option in response to the state.

The method may include selecting a number of partitions of the each codeword to be interleaved based upon the state.

The method may include selecting between programming different portions of a same codeword by a same type of programming, and programming different portions of the same codeword by different types of programming; wherein the different types of programming comprise at least two out of most significant bit (MSB) programming, central significant bit (CSB) programming and least significant bit (LSB) programming.

The method may include selecting a threshold voltage distribution affecting scheme in response to the state.

The method may include selecting a threshold voltage distribution affecting parameter out of a start program value, a program voltage step size and a program voltage step window.

The method may include selecting an analog equalization parameter.

The method may include encoding wherein for a low wear level of the flash memory cells the encoding may include using short codewords and the programming may include applying analog equalization.

The method may include encoding wherein for a high wear level of the flash memory cells, the programming may include applying interleaving and does not comprise applying analog equalization.

The programming may include applying programming parameters that result in nearly equal bit error rate for each read threshold regardless of a type of programming.

The encoding may include using a different encoding scheme for each page type of programming.

The method may include performing partial decoding.

The method may include changing sizes of payloads and of redundancy information as a response of the state of the flash memory cells while maintaining in relation to the flash memory cells a substantially constant ratio between an aggregate size of stored information and an aggregate size of redundancy information.

The flash memory cells may include multiple sets of flash memory cells and wherein the method may include applying the encoding of a portion of the information entity based upon a state of a set of flash memory cells that is expected to store the portion of the information entity.

The flash memory cells may include multiple sets of flash memory cells and wherein the method may include applying the programming of a portion of the information entity based upon a state of a set of flash memory cells that is expected to store the portion of the information entity The method may include applying the encoding such as to increase a size of redundancy bits with an increase of a wear level of the flash memory cells.

The method may include performing state responsive buffering in response to the state of the flash memory cells.

Further embodiments of the invention include a computer readable medium that is non-transitory and may store instructions for performing the above-described methods and any steps thereof, including any combinations of same. For example, the computer readable medium may store instructions for encoding an information entity by applying a state responsive encoding process to provide at least one codeword; wherein the state responsive encoding process is responsive to a state of flash memory cells; and programming the at least one codeword to at least one group of flash memory cells by applying a state responsive programming process that is responsive to the state; the state being either an estimated state or an actual state.

Additional embodiments of the invention include a system arranged to execute any or all of the methods described above, including any stages and any combinations of same. For example, the system may include a flash memory controller that may include an encoding circuit configured to encode an information entity by applying a state responsive encoding process to provide at least one codeword; wherein the state responsive encoding process is responsive to a state of flash memory cells; and a programming circuit configured to program the at least one codeword to at least one group of flash memory cells by applying a state responsive programming process that is responsive to the state; the state being either an estimated state or an actual state.

Additional embodiments of the invention include a method for state responsive programming, the method may include programming at least one codeword to at least one group of flash memory cells by applying at least two state responsive programming operations, each state responsive programming operation is responsive to a state of flash memory cells.

The duration of the programming is inversely proportional to a reliability level associated with the state of the flash memory cells.

The at least two state responsive programming operations are selected out of a state responsive interleaving, a stage responsive analog equalization, and state responsive programming iterations.

The method may include selecting between a non-interleaving option, an inter-flash memory die interleaving option and an intra-flash memory die option in response to the state of the flash memory cells.

The method may include selecting a number of partitions of the each codeword to be interleaved based upon the state of the flash memory cells.

The method may include selecting between (a) programming different portions of a same codeword by a same type of programming, and (b) programming different portions of the same codeword by different types of programming, wherein the different types of programming comprise at least two out of most significant bit (MSB) programming, central significant bit (CSB) programming and least significant bit (LSB) programming.

The method may include selecting in response to the state of the flash memory cells at least one out of a start program value, a program voltage step size and a program voltage step window.

The method may include selecting an analog equalization parameter.

Further embodiments of the invention include a computer readable medium that is non-transitory and may store instructions for performing the above-described methods and any steps thereof, including any combinations of same. For example, the computer readable medium may store instructions for programming at least one codeword to at least one group of flash memory cells by applying at least two state responsive programming operations, each state responsive programming operation is responsive to a state of flash memory cells.

Additional embodiments of the invention include a system arranged to execute any or all of the methods described above, including any stages and any combinations of same. For example, the system may include a flash memory controller that may include a programming circuit configured to program at least one codeword to at least one group of flash memory cells by applying at least two state responsive programming operations, each state responsive programming operation is responsive to a state of flash memory cells.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
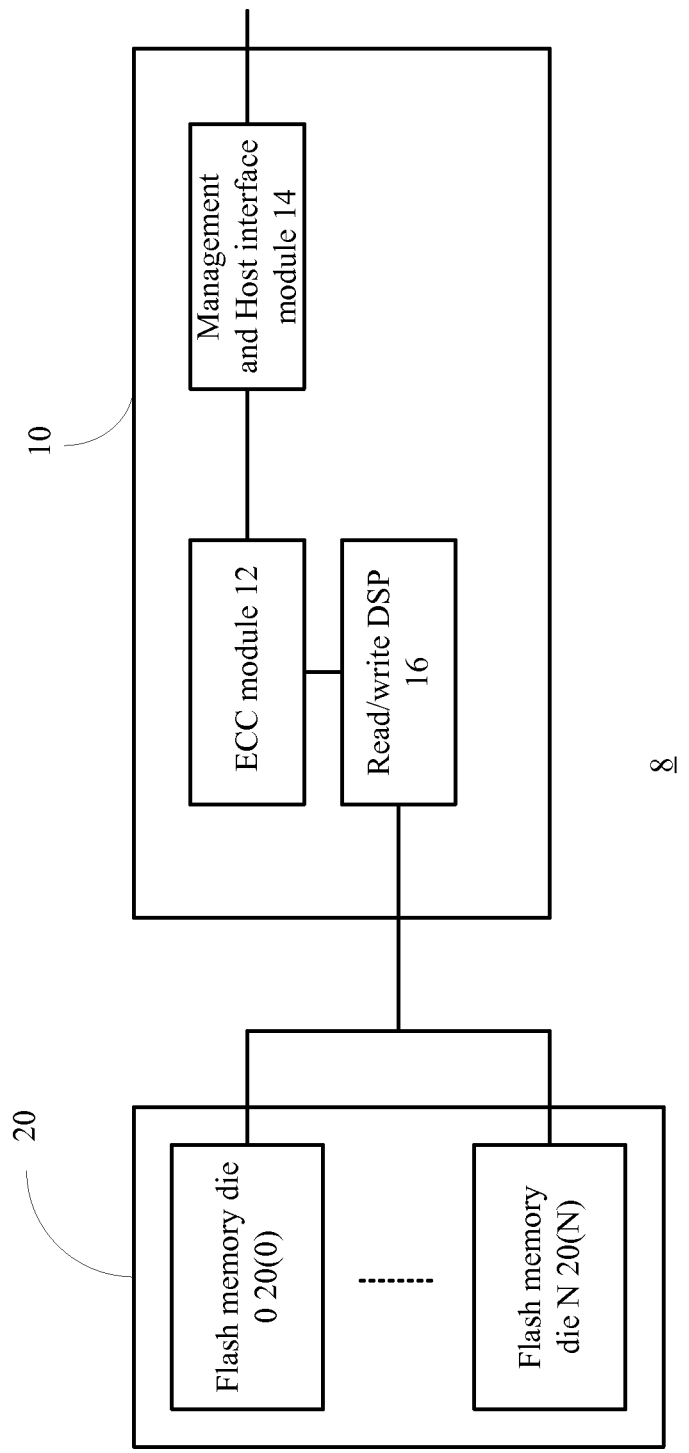
FIG. 1 illustrates a prior art flash memory controller and its environment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The terms write and program are used interchangeably in this specification.

According to various embodiments of the invention there are provided a flash memory controller, a method and a non-transitory computer readable medium for adaptation of a state responsive encoding process and, additionally or alternatively of a state responsive programming process that may increase performance without sacrificing reliability of a flash memory device.

The state responsive encoding process can be implemented by a configurable error correction code (ECC) encoder. The state responsive encoding process can include selecting a configuration of the configurable ECC encoder. The state responsive programming process can includes electing a programming strategy.

Any one of the mentioned above strategies can be responsive to a state of flash memory cells of the flash memory device. These flash memory cells can be those that are to be programmed during the state responsive programming process, but this is not necessarily so.

These flash memory cells (of which their state is being monitored) can be the entire flash memory cells of the flash memory device or can be a portion thereof. The flash memory device can include multiple flash memory dies and the flash memory cells can belong to the same flash memory cell die or to different flash memory cell dies.

These flash memory cells can belong to adjacent rows or to different rows of the flash memory device.

The state of the flash memory cells can be the actual state of the flash memory cells or an estimated state of the flash memory cells. The state can represented by an actual or estimated wear level or by any other wear attribute associated with the flash memory cells. The state of the memory cells can reflect the reliability (for example—raw error bit rate) associated with reading (and additionally or alternatively) programming of the flash memory cells. The reliability can be represents by bit error rates, log likelihood ratio or any other reliability attribute.

The state of the flash memory cells can be estimated based upon a cycle count or any other wear estimate. A non-limiting example of wear estimates is provided in U.S. patent application filing date Jan. 3, 2012, Ser. No. 13/342,946, which is incorporated herein by reference in its entirety.

For example, the wear level can be estimated based upon a speed of programming of information—as higher wear levels are associated with faster programming. The wear level can be estimated by taking into account the PE cycle count and the timing of these P/E cycles—as the flash memory cells tend to recover when there are longer periods between the P/E cycles.

There may be provided a combination of the state responsive encoding process and a state responsive programming process and this combination may allow to continuously provide a tradeoff between the read/write performance with at least a minimal desired reliability.

At a low wear state the state responsive encoding process and the state responsive programming process can be done so that the write and read performance are maximized. For example, codewords can be configured to be short, and hence the controller does not need to wait till a long chunk of data is available before actually doing the programming operation. Interleaving of codewords can also be provided and be optimized for programming and read performance. For example, if no interleaving is used then once there is enough data to fill a whole page it can be written to a flash memory device, and during read, only a single page is read rather than reading multiple pages for decoding per codeword.

As the state of flash memory cells changes the manner in which these state responsive encoding and/or programming processes are applied may also change.

These changes may minimize the penalty in performance and guarantee at least minimal reliability. Towards the maximal allowable program erase (PE) cycles, the state responsive programming process can be implemented in a most conservative strategy so that reliability is not sacrificed.

The state responsive encoding process can include encoding of new information entities via a set of codes to provide one or more codewords, where the codeword size is increased, and at the same time payload size or the code rate itself per page type can change so that the raw bit error rate (RBER) supported per code matches the page type.

The average coding rate may remain unchanged so that the same amount of information can be stored at the flash memory device. The change in the coding strategy may only organize the information differently as to maximize reliability. For example, in multi-level cell (MLC) flash memory devices the read of most significant bit (MSB) pages is associated with RBER which is twice as low than the LSB pages.

This is since the least significant bit (LSB) page read corresponds to a decision based on two read thresholds, while the MSB read requires comparison with a single read threshold, and nearly half the cells are considered highly reliable here. The variable code rate may also change for different rows per block for increasing the guaranteed reliability.

State responsive Encoding:

The state responsive encoding process can select the code efficiently at the start of life (or any other low wear level state) to maximize the read and/or write performance (such as read speed, programming speed, read throughput or programming throughput). When the wear state of the flash memory cells increases, the flash memory controller may change one or more encoding parameters of the state responsive encoding process to allow variable protection matched to expected higher error rates and uses longer codewords, for increased correction capabilities. This can be done without changing the flash capacity, and by using a fixed amount of flash spare area.

An example of a state responsive encoding process is provided in U.S. patent application Ser. No. 13/036,796 filing date Feb. 28, 2011 and in U.S. patent application Ser. No. 13/036,622, filing date Feb. 28, 2011, both being incorporated herein by reference in their entirety.

State Responsive Programming:

According to various embodiments of the invention the state responsive programming process can change at least one voltage threshold distribution (VTD) affecting parameter to alter the VTD of a group of flash memory cells (of the flash memory device) that are being programmed. Thus, the location of one or more lobes of the VTD can be changed, the width of one or more lobes of the VTD can be changed, the overlap between one or more pairs of adjacent lobes of the VTD can be changed and the like.

The change of the VTD may include analog equalization in which the overlapping between different pairs of adjacent lobes of the VTD is made different from each other in order to at least partially compensate for different bit error rates associated with programming (or reading) of different types of programming. For example, a Most Significant Bit (MSB) programming uses a single MSB read threshold and a Least Significant Bit (LSB) programming of a 2 bit per cell flash memory cells use two LSB read threshold and is subjected to more (twice) errors. This can be compensated by having the a pair of lobes of the VTD that surround the MSB read threshold to be more overlapping than other lobes that surround each of the LSB read thresholds.

The programming of a flash memory cell is done by executing multiple programming iterations—starting from a programming iteration in which a start program voltage is provided and then changing the voltage by a program voltage step—until reaching a maximal voltage or a maximal number of programming iterations. Each of these programming parameters can be changed and thus changing the VTD. In a nut shell, higher program voltage steps speed the programming process but result in wider lobes.

As another embodiment, the programming parameters can be used to maximize the performance by setting the state responsive programming parameters when the wear state is low to obtain a short programming time (tProg) which is the time from when an information entity is ready for programming till it is successfully programmed in the flash memory device. For obtaining a small tProg it may be required to use, for example, a relatively high program voltage step, and high start program voltage.

The state responsive programming can include interleaving of every codeword between different planes or dies. Thus, a selection between different types of interleaving can be selected—in response to the state of flash memory cells. Thus, the selection can be made between a non-interleaving option, an inter-flash memory die interleaving option and an intra-flash memory die option in response to the state of the flash memory cells. Interleaving can also be done, for example, between even and odd pages per codeword. The selection can include selecting a number of partitions of the each codeword to be interleaved based upon the state of the flash memory cells. The selection can include selecting between (a) programming different portions of a same codeword by a same type of programming, and (b) programming different portions of the same codeword by different types of programming, wherein the different types of programming comprise at least two out of most significant bit (MSB) programming, central significant bit (CSB) programming and least significant bit (LSB) programming.

The interleaving can be made between consecutive pages on the same physical block, or these can be pages on different dies. Such interleaving contributes to RBER equalization, and hence more cycles can be done till the codeword with highest RBER approximates the decoder capabilities.

Non-limiting examples of interleaving schemes are illustrates in U.S. patent application Ser. No. 12/942,802 filing date Nov. 9, 2010 and in U.S. patent application Ser. No. 13/299,276 filing date Nov. 17, 2011, both being incorporated herein by reference in their entirety.

The interleaving can also be applied on pages of different types, for example, a codeword may be programmed in part to an MSB page, and in part to an LSB page. The advantage here is again a good equalization of the RBER after retention, however, the read/write penalty here may be large, since write of LSB pages can be done only after programming the MSB pages. In addition, every read request requires reading both parts of the codeword and thus the read time is always governed by the slower page readout, which is usually the LSB page in 2-bpc memory devices. Such interleaving might pose a major performance penalty. In order to avoid this penalty, the interleaving in this example is between pages of the same type (MSB-MSB or LSB-LSB). The RBER is matched by performing analog equalization, as explained above. As the range discussed is already some mid-range P/E cycles, the adaptive programming parameters are also adapted, such that the lobe distribution after programming is more accurate. This is required since as the wear state grows the retention effect is more pronounced.

The interleaving may include interleaving a codeword between even pages of one flash memory die and odd pages on another flash memory die, or interleaving between either even pages on both flash memory dies or odd pages on both flash memory dies. While the former interleaving may be slower than the latter but more reliable.

Table 1 provides an example of a state responsive encoding process and a state responsive programming process. The state responsive programming process is illustrates as including three different state responsive programming operations—a state responsive interleaving, a state responsive analog equalization and state responsive programming iterations.

Table 1 illustrates a mapping between an estimated state of a 2 bpc flash memory device (represented by a PE count) and various responsive programming operations. In this example, every page contains 8192 Bytes for data and 1024 Bytes as spare area (usually used by the ECC).

It was assumed that the flash memory controller can perform 10000 PE cycles.

| OPERATION | | PE ≤ 1000 | 1000 < PE ≤ 5000 | 5000 < PE ≤ 10000 |
|---|---|---|---|---|
| Encoding size per codeword | MSB Page Payload length | 512 [B] | 4,096 [B] | 8,312 [B] |
| | MSB page redundancy length | 64 [B] | 512 [B] | 904 [B] |
| | LSB Page | 512 [B] | 4,096 [B] | 8,072 [B] |

-continued

| OPERATION | | PE ≤ 1000 | 1000 < PE ≤ 5000 | 5000 < PE ≤ 10000 |
|---|---|---|---|---|
| | Payload length LSB page redundancy length | 64 [B] | 512 [B] | 1144 [B] |
| Interleaving | | None | 2-way | 4-way |
| Analog Equalization | | YES | YES | NO |
| Flash Programming parameters | Start Program Voltage | 15 V | 13.5 V | 12 V |
| | Program voltage step | 1 V | 0.7 V | 0.2 V |
| | LSB Program voltage window | [0, 1.2, 3] V | [0.1, 1.7, 3.8] V | [0.2, 2.2, 4.5] V |

As long as the PE cycle is within a first PE range—below 1,000 PE cycles—then the state responsive encoding process uses codewords that have a payload of 512 B long. The state responsive programming of such codewords may be done without using interleaving. This means that when attempting to read a sector (of size 512 B) from the flash memory device, the read can be done from a single page of the flash memory device. This way when multiple read commands are issued, on a multi-channel NAND system, the read operations can be executed nearly simultaneously, and the read performance is at its full utilization—there are no extra read-outs for obtaining a 512 B sector.

The programming parameters for this first range of PE cycles include a high start program voltage of 15V, and a relatively large program voltage step of 1V. The voltage window size is also small and is about 3V. This enables fast programming.

When the PE cycle is within this first range there is no need to perform analog equalization.

Once the PE cycle exceeds 1000 but is below 5000 the state responsive encoding and programming process change. When the PE cycle count is within in this second PE range the size of the codewords is increased to having a payload of 4 KB for all page types.

Interleaving can be done over two pages (2-way), for example half the codeword on an even page and the other half some odd page.

Table 1 also illustrates the change in various programming parameters such as start program voltage, program voltage step and LSB program voltage window. The start program voltage and the program voltage step decreases between PE ranges to provide slower and more accurate lobes as the PE count increases and the program voltage window also increases and controls the location of the lobes.

Table 1 illustrates three different PE ranges. It is noted that the number of PE ranges and their size can change from those illustrated in the table and that different combination of state responsive programming operations and state responsive encoding parameters can be provided.

Such changes can be applied continuously changes from one PE to another and over time. Usually, from practical considerations, there will be just a few sets of programming strategies and encoding configurations which will be used during the lifespan of the device.

Figure 2:
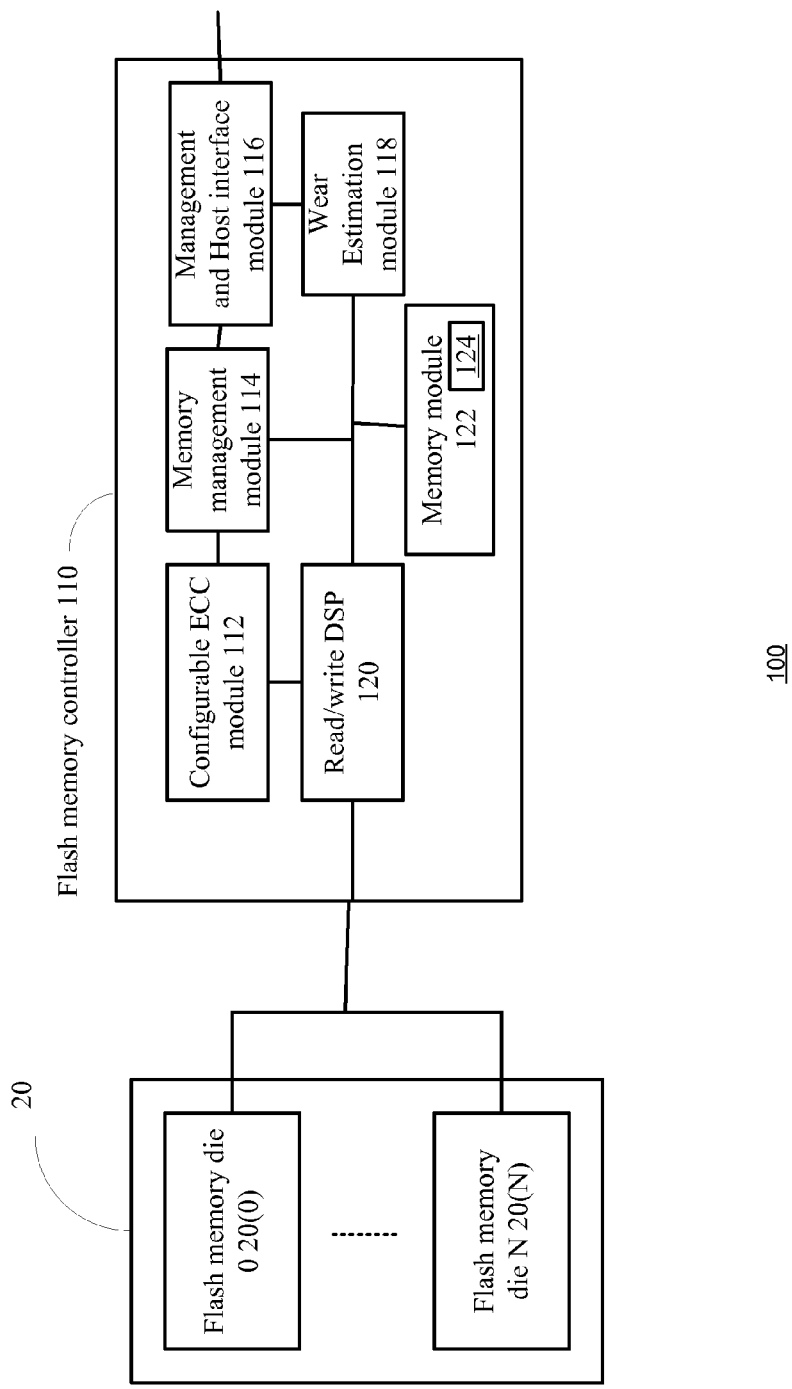
FIG. 2 illustrates a prior art flash memory controller and its environment.

FIG. 2 depicts a block diagram of a system 100 according to an embodiment of the invention.

The system 100 can apply state responsive encoding processes, state responsive programming processes and may apply a combination thereof. System 100 can execute any of the methods illustrated in this specification.

The system 100 include an encoding circuit such as configurable ECC module 112, a programming circuit such as read/write DSP 120, a memory management module 114, a wear estimation module 118, a management and host interface module 116 and a memory module 122 for storing a metadata data structure 124. The metadata 124 include information about the manner that state responsive programming process was done and about the manner that an encoding process (such as state responsive encoding process) was done.

The configurable ECC module can be configured according to the state of the flash memory device 20—especially according to their actual or estimated wear level.

The wear estimation module 114 can be a dynamic estimator which may for example calculate the average tProg and provide an estimation of the wear state accordingly. Alternatively, the wear state can be directly inferred from a PE cycle counter, like exemplified in Table 1. The PE counter can assigned per physical block, per flash memory die, or per the entire flash memory device 20. The memory management module 114 can apply a wear balancing policy that is aimed to provide a substantially equal wear level for all physical blocks (or a few sets of physical blocks) of the flash memory device 20.

The system in this Figure includes also a DSP which is controlled also by the management block. The DSP has to set the Flash parameters for programming in order to obtain the desired program speed and accuracy, while implementing the current interleaving scheme. The DSP also has to estimate the read thresholds in order to minimize the read-out errors for every codeword, so that the decoder is able to reliably decode its input.

The memory management module 114 can receive an indication about a wear level of flash memory cells and in response determine how to configure the configurable ECC module, which programming strategy to apply and the like. It can determine, whether to apply analog equalization, which interleaving strategy to apply, can determine which program iteration parameters to apply and the like. The outcome of these determinations is fed (for example by commands) to the configurable ECC module 112 and to the read/write DSP 120.

For every read/write request from the host the memory management module 114 can locate the associated page/pages to read/write and generates ECC commands to the configurable ECC module 112 and generate programming commands to the read/write DSP 120. For example, the memory management module 114 may generate a sequential read command of two consecutive codewords, which have a relatively short payload and the necessary data for the host is encoded by these to codewords. This may often be the case when using the variable code strength strategy towards devices' end-of-life.

When variable coding is used the configurable ECC module 112 may be configured according to the code parameters that are associated with the wear state, page type, and row set. The memory management module 114 may also dictate the interleaving scheme that is used for read/write of data to physical locations in the flash memory device 20.

Figure 3:
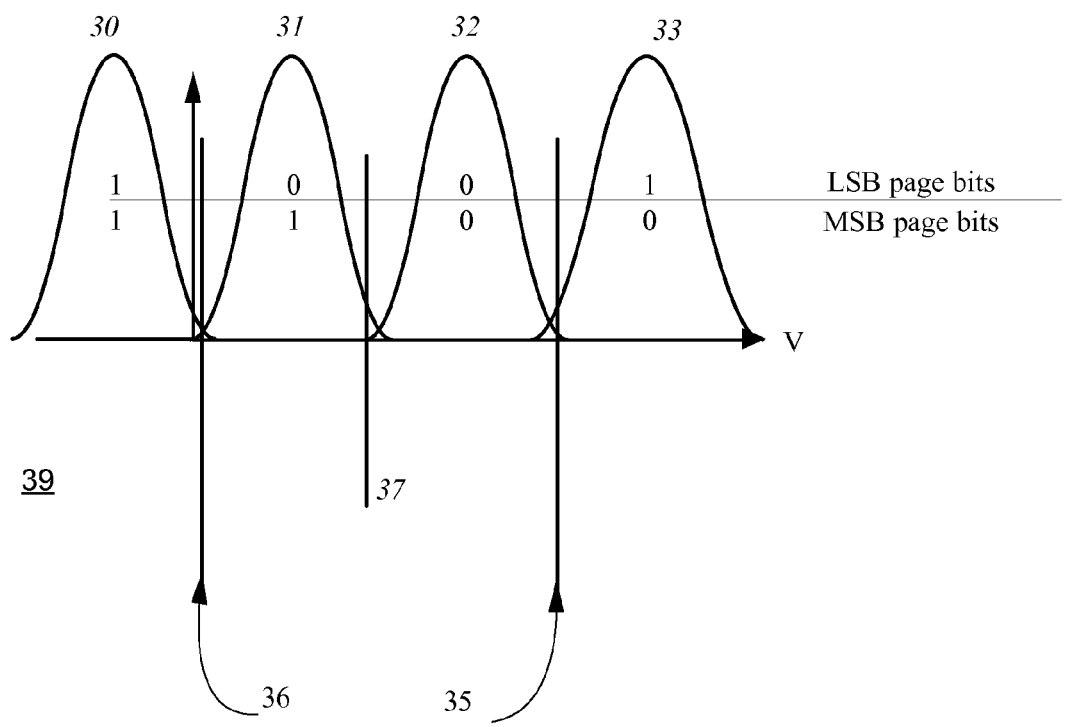
FIG. 3 illustrates a prior art threshold voltage distribution of a two bits per cell flash memory cell.

Analog Equalization:

FIG. 3 illustrates a VTD 39 of a 2 bpc flash memory device. The VTD 39 includes four lobes 30-33. A MSB read threshold 37 in set between lobes 31 and 32. A first LSB read threshold 36 is set between lobes 30 and 31. A second LSB read threshold 35 is set between lobes 32 and 33.

The VTD 39 changes over time and due to the increase in PE cycles. A dominant effect, in floating gate NAND Flash technology, for change over time is known as detrapping, where there is charge leakage from the gate. Detrapping increases threshold variance with the PE cycles. As the number of cycles increases, the number of traps also increases. The relation to the number of cycles is derived in the empirical model described in: Mielke, N. Belgal, H. Kalastirsky, I. Kalavade, P. Kurtz, A. Meng, Q. Righos, N. Wu, J. "Flash EEPROM Threshold Instabilities Due to Charge Trapping During Program/Erase Cycling", IEEE Transactions on Device and Materials Reliability, Vol. 4, No. 3, September 2004, p 335-344, which is incorporated herein in its entirety by reference.

Since the VTD changes over time and PE cycles, a read operation may require learning the statistics and only then placing the thresholds for the read operation which is used as input for the decoder. In case there are not too many errors, a hard input for the decoder may suffice once the statistics is known up to a sufficiently high accuracy. It is mainly required for setting read threshold such that a minimal number of read errors are obtained for the decoder inputs.

When there are relatively many errors, it may be not be enough to provide just a single hard decision input, which is obtained by a single read, to the decoder. In such cases, a soft decoder may be applied when soft information, or reliability information, for each bit is provided to the decoder. This information is achieved by performing multiple read operations by the read/write DSP 120 using different read thresholds. Referring to FIG. 3, reading the MSB page bits with soft input may require sampling multiple times around MSB read threshold 34 and to provide reliability metrics accordingly. For providing soft input to the decoder when reading the LSB page bits, it is required to perform multiple read operations around each one of LSB read thresholds 33 and 35. The example in FIG. 2 demonstrates nearly equally spaced lobes which mean that MSB pages suffer nearly half the amount of errors associated with LSB pages. This behavior may dictate a variable coding strategy such that life-span of the device is maximized by matching the code rate, to the page type RBER statistics. For example, MSB pages can be programmed using a high rate code and the LSB pages may use a low rate code, such that the average coding rate is equal to the Flash spare area (available redundancy) and the data area is kept fixed.

This means that variable coding strategy can be used to match the typical dynamics of different page types according to the typical end-of-life RBER. A non-limiting example of such adaptations is illustrated in U.S. patent application Ser. No. 12/836,948 having a filing date of Jul. 10, 2010, which is incorporated herein by reference.

However, like indicated, the penalty of processing variable length codes potentially introduces performance degradation.

Figure 4:
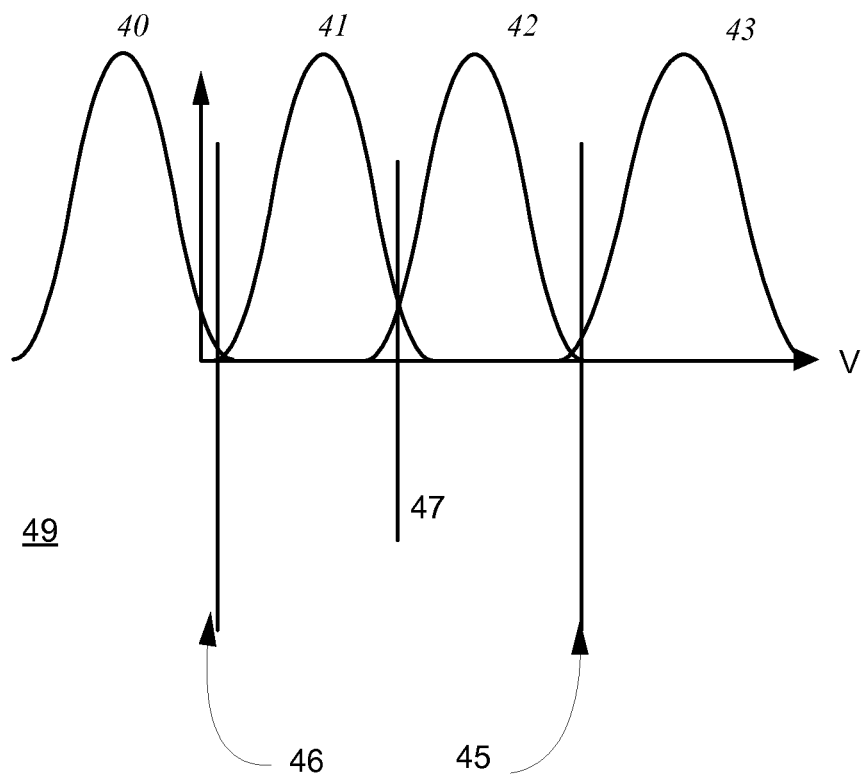
FIG. 4 illustrates a threshold voltage distribution of a two bits per cell flash memory cell when applying analog equalization according to an embodiment of the invention.

FIG. 4 illustrates a VTD 49 that undergone analog equalization according to an embodiment of the invention.

VTD 49 illustrates four unevenly spaced lobes 40-43.

A MSB read threshold 47 in set between lobes 41 and 42. A first LSB read threshold 46 is set between lobes 40 and 41. A second LSB read threshold 45 is set between lobes 42 and 43.

The spacing between the lobes 40-43 are unequal as the distance between lobes 41 and 42 was decreased (in relation to the distance between lobes 31 and 32 of FIG. 3) while the distance between other lobes was increased (in relation to the distance between corresponding lobes of FIG. 3).

The overlap between lobes 41 and 42 was increased such as to increase the RBER associated with the MSB read process. The overlap between lobes 42 and 43 as well as the overlap between lobes 40 and 41 was decreased to reduce the RBER associated with each LSB read process.

This analog equalization allows programming with fixed size codewords and equal payload sizes. The analog equalization increases the number of errors expected when reading an MSB page, while at the same time decreases the readout errors of the associated LSB page. Such equalization may allow maximization of read/write performance due to the equal codes to be used for more PE cycles. This is since for a given code the maximal number of PE cycles is determined by the codeword suffering from highest RBER, and when the lobes are equally spaced the LSB pages will govern the max P/E cycles at a much earlier wear state.

Flow Charts and Performance

Figure 5:
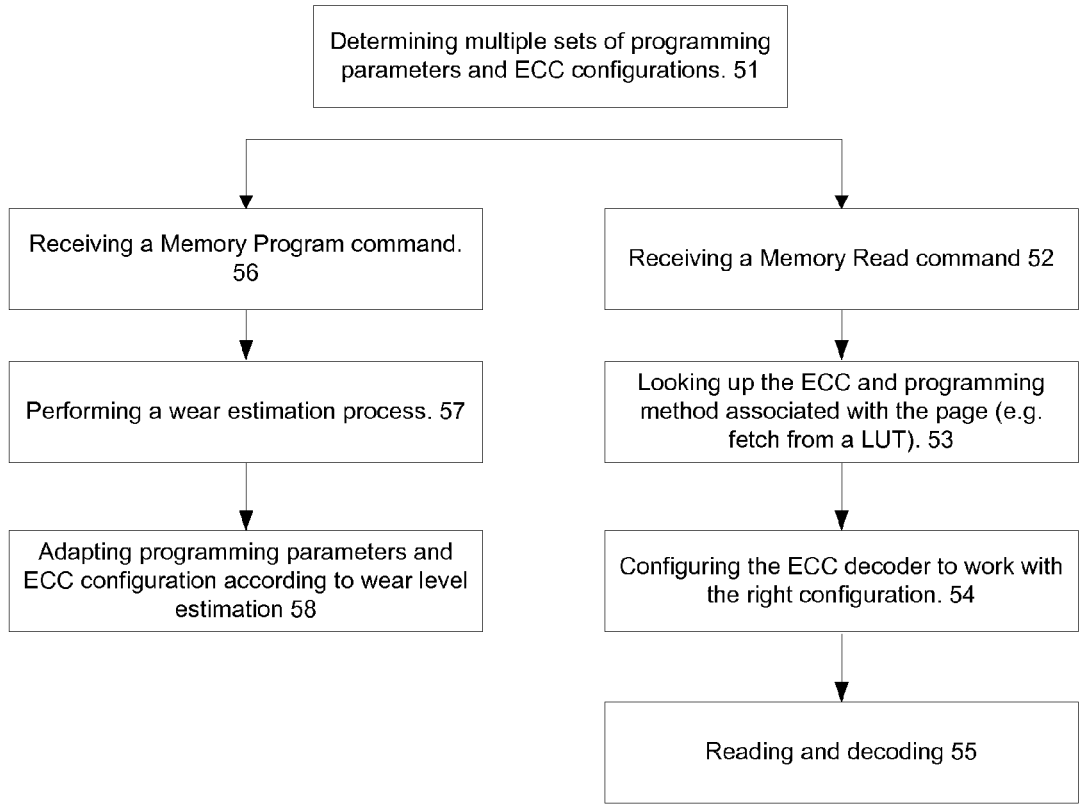
FIG. 5 illustrates a method according to an embodiment of the invention.

FIG. 5 illustrates a method 50 according to an embodiment of the invention. Method 50 starts by determining (51) multiple sets of programming parameters and ECC configurations 51. Typically, this determining can be done for every family of flash memory devices, and may be executed during the flash memory devices sort process in production.

This stage can provide multiple sets of strategies (at least two) so that performance is maximized at start of life and the other set for maximizing the devices life-span and achieving highest possible wear states. In some cases the wear estimation is done online, in real time, as to adapt the program strategy to the actual estimated wear state characteristics.

For example, the adaptive programming parameters may be adapted based on the distribution of the programming results (see, for example, U.S. patent application Ser. No. 12/769,208 filing date Apr. 28, 2010, which is incorporated herein by reference).

When getting a write command from the host (56), the wear level is estimated (57) and a selection is made (58) of programming parameters, the interleaving scheme, and the encoding scheme—wherein the selection is based on the wear state. Once selected, a write operation for the encoded payload can be issued.

When a read command is received (52), the management module may retrieve (53) from a look up table LUT the program strategy that was used for the pages to be read (This can be done by reading a value associated with the current wear state from a memory in the controller). Then the DSP read operation is set (54) and the ECC parameters are to be configured for decoding the associated codewords. The decoding result can be passed on to the host.

Figure 6:
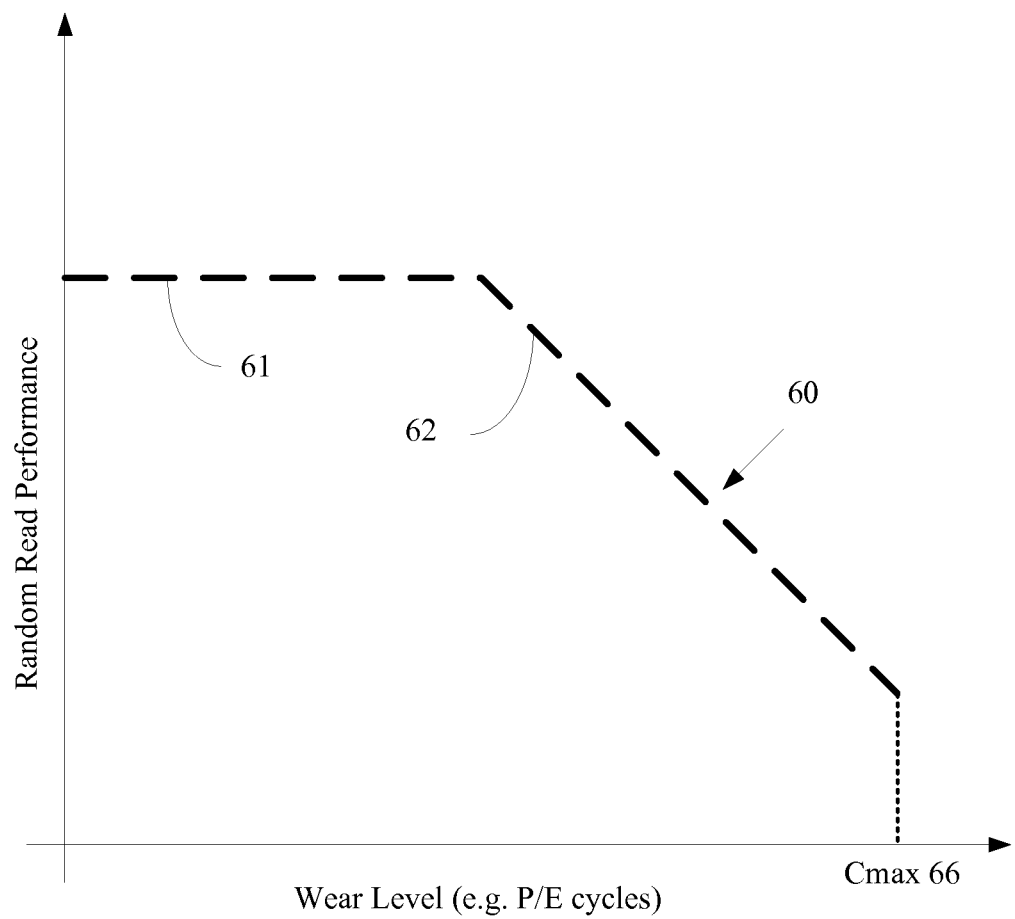
FIG. 6 illustrates a prior art relationship between read performance and erase count.
Figure 7:
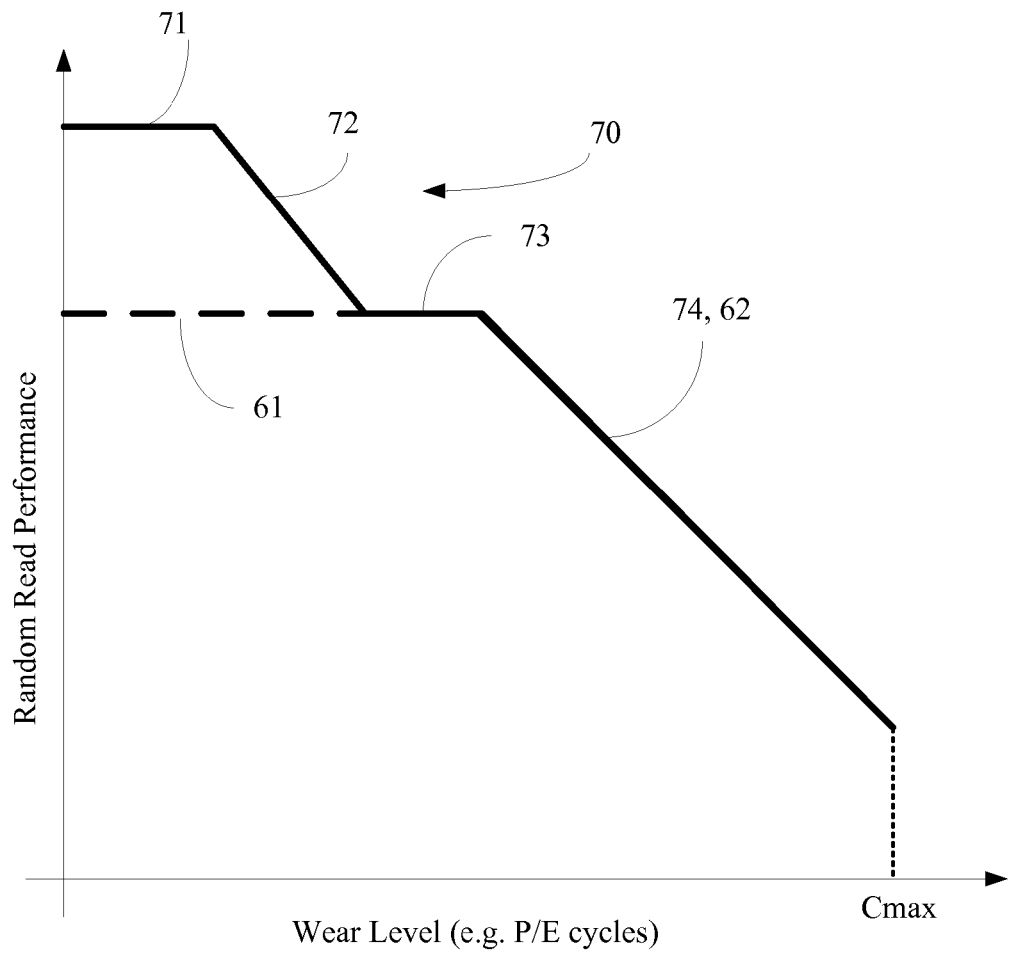
FIG. 7 illustrates a relationship between read performance and program erase count according to an embodiment of the invention.

FIG. 7 illustrates a random read performance curve 70 according to an embodiment of the invention. FIG. 7 also illustrates a prior art performance curve 60 that is the same as curve 60 of FIG. 6.

The performance is measured versus the PE cycles. Curve 70 includes a first vertical portion 71 that is followed by a first negative sloped portion 73, a second horizontal portion 73 and a second curved portion 74.

The first vertical portion 71 is shorter than the horizontal portion 61 of curve 60 and higher than that horizontal portion 61. The second horizontal portion 73 is shorter than the horizontal portion 61 and has the same random read performance value as the horizontal portion. The second negative sloped portion 74 overlaps negative sloped portion 62.

As may be noticed the start-of-life performance (first horizontal portion 71) is much higher than the associated prior art system performance (horizontal portion 61). The main reason for that is the use of a configurable ECC which has a short and fixed payload length at the start of life. In addition, the interleaving scheme here is optimized for performance, e.g. codeword might be non-interleaved and written in whole to a single page during start of life.

At some wear state the performance starts degrading (first negative sloped portion 72) due to the non-optimal ECC and interleaving configuration. This makes the DSP overhead to be non-negligible. For example, the accuracy of read thresholds may be more critical here, and thus multiple read thresholds' searches are executed. In addition, the DSP might have to do some rare soft sampling which introduces a performance overhead.

At some point where performance degrades to that of a reliability maximized scheme, the programming strategy is changed, and the read performance is somewhat degraded but keeps on a constant value (second horizontal portion 73) up to some point where it also has to activate the DSP more and more. In the maximized reliability strategy, the codewords' payload might have a variable length according to the expected RBER after retention on the specific page (or page set). This is done while maintaining the average rate constraint (which keeps the usable area on the flash memory device fixed). The average payload length can also relatively high to accommodate higher average RBER. At the end-of-life, i.e. near Cmax the DSP has to perform high resolution sampling to provide soft input, with high probability, since the input RBER is usually at its maximal value on many pages.

Figure 8:
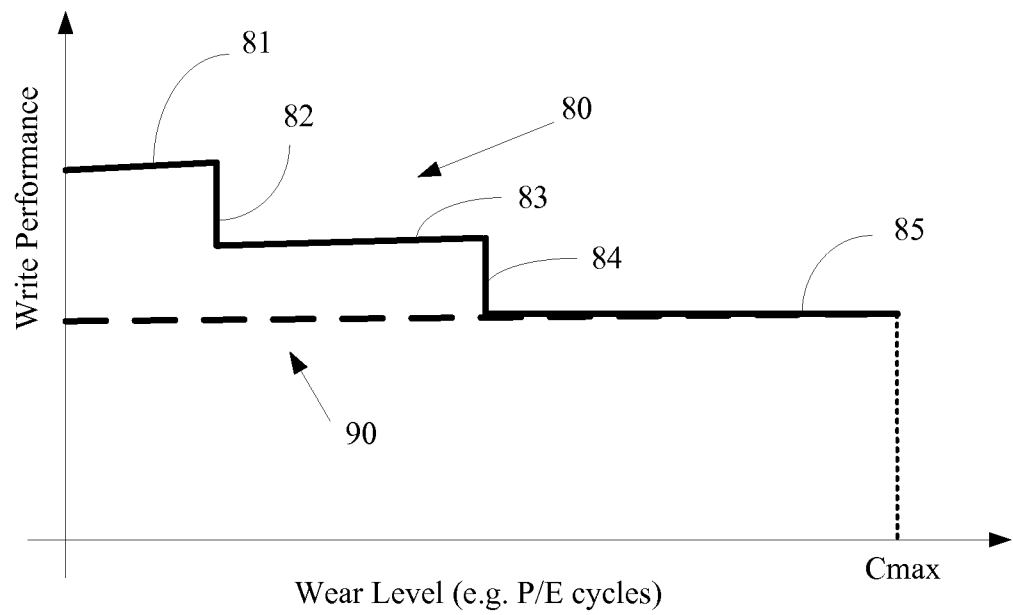
FIG. 8 illustrates a relationship between write performance and program erase count according to an embodiment of the invention.

FIG. 8 illustrates a write performance curve 80 according to embodiments of the invention. FIG. 8 also illustrate a prior art write performance curve 90.

The performance is measured versus the PE cycle. This is compared to a prior art curve 90, where the write performance is nearly constant throughout the devices lifespan—although is has a positive slope.

As may be noticed, the start-of-life performance associated with the first programming strategy is considerably higher than that of prior art—as illustrate by first positive sloped portion 81. This is since the encoding here is done on small codewords, and employs performance optimized interleaving. The example here includes usage of three different programming strategies as function of the wear state. This is why at some point there is a step change (82) in the write performance to some lower level write throughput which is followed by a increase in the write performance (second positive sloped portion 83), and later on there is another step change (84) that results in write performance (third positive sloped portion 85) equal to that of the prior art performance where the programming strategy is reliability optimized (including optimized ECC configuration for reliability per page set and codeword interleaving, along with adaptive programming parameters). As may be noticed, the throughput slightly increases as function of the wear state for a certain programming strategy. The reason for this slight throughput increase is that more and more trapped charge is accumulated in the memory cells, and therefore the average programming time becomes shorter as the wear state increases.

Figure 9:
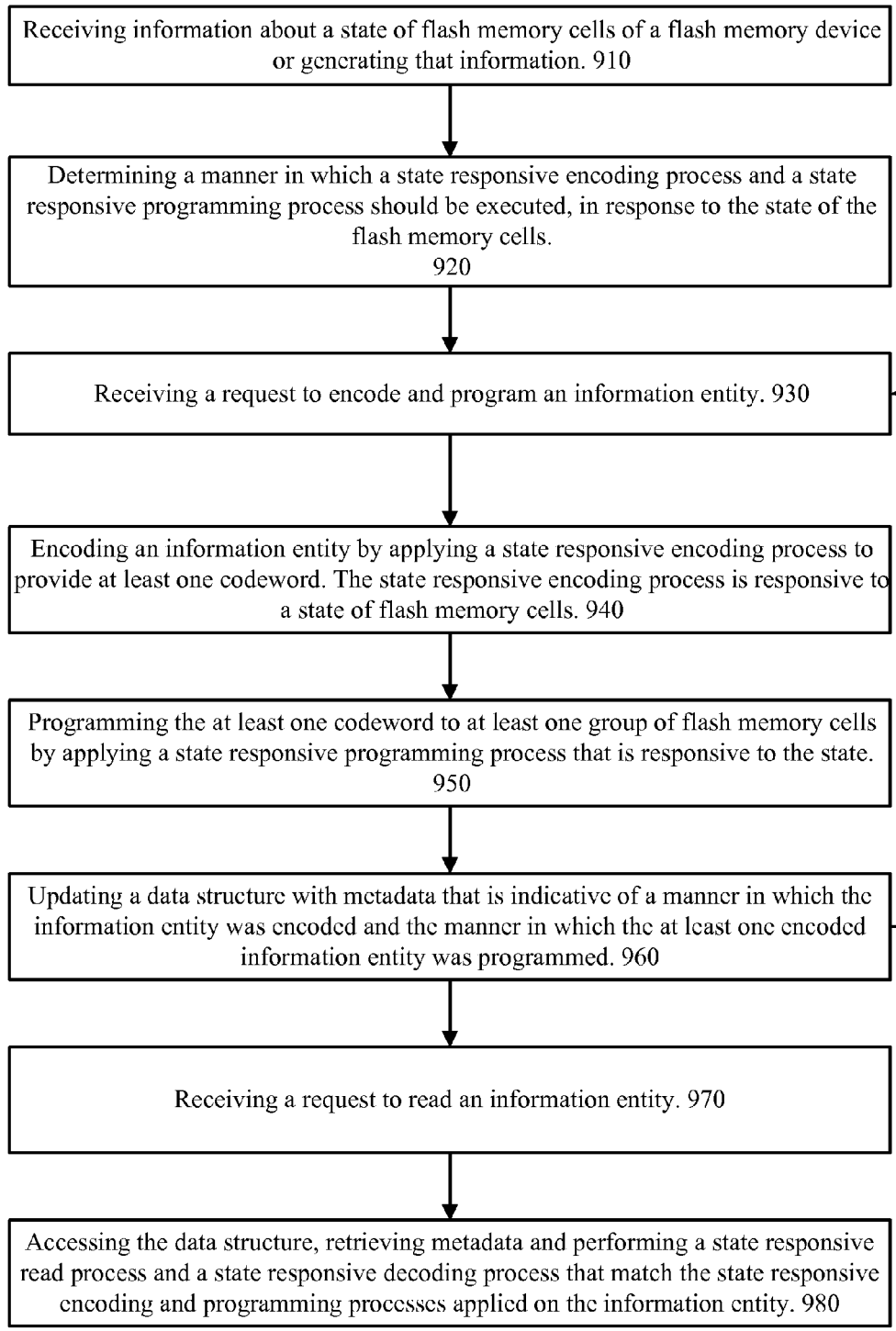
FIG. 9 is a flow chart according to an embodiment of the invention.

FIG. 9 illustrates a method 900 for state responsive encoding and programming according to an embodiment of the invention.

Method 900 may start by stage 910 of receiving information about a state of flash memory cells of a flash memory device or generating that information. The state can be the wear state of the flash memory cells. The state can be either an estimated state or an actual state.

Stage 910 may be followed by stage 920 of determining a manner in which a state responsive encoding process and a state responsive programming process should be executed, in response to the state of the flash memory cells.

Stage 920 can include at least one of the following:
 a. Determining the manner in which the state responsive programming process and state responsive decoding processes should be applied so that an aggregate duration of the encoding and the programming can be inversely proportional to a reliability level associated with the state.
 b. Selecting a length of each codeword in response to the state.
 c. Selecting a length of each codeword that is inversely proportional to a wear level of the flash memory cells.
 d. Selecting an interleaving scheme to be applied during the state responsive programming process, in response to the state (for example—non interleaving or any of the mentioned below interleaving schemes).
 e. Selecting between a non-interleaving option, an inter-flash memory die interleaving option and an intra-flash memory die option—the selection is made in response to the state.
 f. Selecting a number of partitions of the each codeword to be interleaved based upon the state (for example—2-way, 4-way and the like).
 g. Selecting between (a) programming different portions of a same codeword by a same type of programming, and (b) programming different portions of the same codeword by different types of programming, wherein the different types of programming comprise at least two out of most significant bit (MSB) programming, central significant bit (CSB) programming and least significant bit (LSB) programming.
 h. Selecting a threshold voltage distribution affecting scheme in response to the state (such as an analog equalization parameter or a program iteration parameter).
 i. Selecting a threshold voltage distribution affecting parameter out of a start program voltage value, a program voltage step size and a program voltage step window.
 j. Selecting an analog equalization parameter—for example whether to perform analog equalization or not, a manner in which the analog equalization should be applied.

Stage 920 can include at least two, three, four, five, six, seven and even eight of the mentioned above stages.

Stage 920 may be followed by stage 930 of receiving a request to encode and program an information entity.

Stage 930 may be followed by stage 940 of encoding an information entity by applying a state responsive encoding process to provide at least one codeword. The state responsive encoding process is responsive to a state of flash memory cells.

Stage 940 may be followed by stage 950 of programming the at least one codeword to at least one group of flash memory cells by applying a state responsive programming process that is responsive to the state.

Stage 950 may be followed by stage 960 of updating a data structure with metadata that is indicative of a manner in which the information entity was encoded and the manner in which the at least one encoded information entity was programmed. This may assist in future read attempts of the at least one encoded information entities.

Stage 960 may be followed by stage 930, by stage 970 of receiving a request to read an information entity or by stage 910.

Stage 970 may be followed by stage 980 of accessing the data structure, retrieving metadata and performing a state responsive read process and a state responsive decoding process that match the state responsive encoding and programming processes applied on the information entity.

Figure 10:
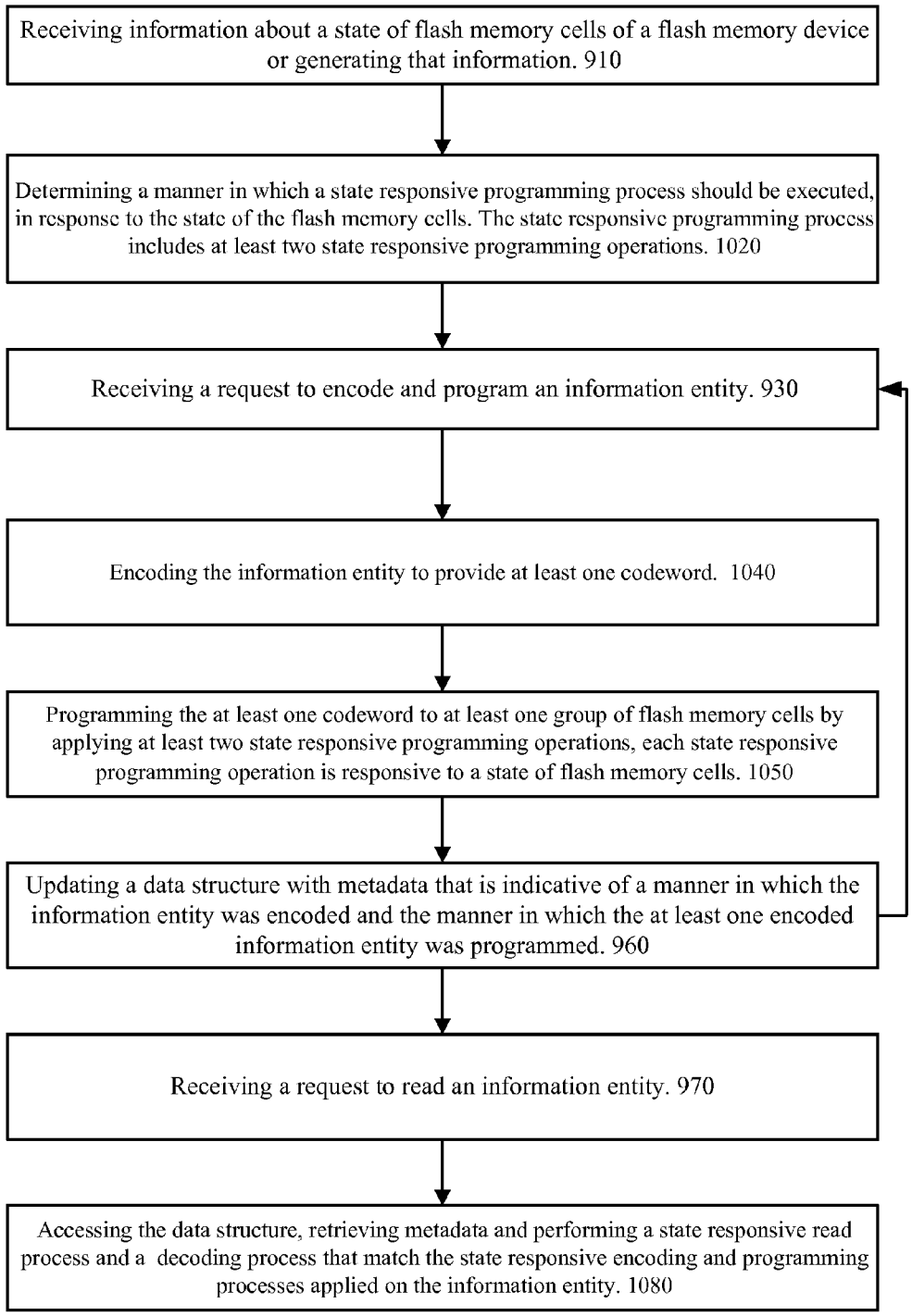
FIG. 10 is a flow chart according to an embodiment of the invention.

FIG. 10 illustrates method 1000 for state responsive programming, according to an embodiment of the invention.

Method 1000 may start by stage 910 of receiving information about a state of flash memory cells of a flash memory device or generating that information. The state can be the wear state of the flash memory cells. The state can be either an estimated state or an actual state.

Stage 910 may be followed by stage 1020 of determining a manner in which a state responsive programming process should be executed, in response to the state of the flash memory cells. The state responsive programming process includes at least two state responsive programming operations.

Stage 1020 may include at least one of the following:
a. Determining the manner in which the state responsive programming process and state responsive decoding processes should be applied so that an aggregate duration of the encoding and the programming can be inversely proportional to a reliability level associated with the state.
b. Selecting an interleaving scheme to be applied during the state responsive programming process, in response to the state (for example—non interleaving or any of the mentioned below interleaving schemes).
c. Selecting between a non-interleaving option, an inter-flash memory die interleaving option and an intra-flash memory die option—the selection is made in response to the state.
d. Selecting a number of partitions of the each codeword to be interleaved based upon the state (for example—2-way, 4-way and the like).
e. Selecting between (a) programming different portions of a same codeword by a same type of programming, and (b) programming different portions of the same codeword by different types of programming, wherein the different types of programming comprise at least two out of most significant bit (MSB) programming, central significant bit (CSB) programming and least significant bit (LSB) programming.
f. Selecting a threshold voltage distribution affecting scheme in response to the state (such as an analog equalization parameter or a program iteration parameter).
g. Selecting a threshold voltage distribution affecting parameter out of a start program voltage value, a program voltage step size and a program voltage step window.
h. Selecting an analog equalization parameter—for example whether to perform analog equalization or not, a manner in which the analog equalization should be applied.

Stage 1020 may be followed by stage 930 of receiving a request to encode and program an information entity.

Stage 930 may be followed by stage 1040 of encoding the information entity to provide at least one codeword. Stage 1040 may include applying a state responsive encoding process but it may include applying a state indifferent encoding process. If state responsive encoding process is applied then stage 1020 may include determining the manner in which the state responsive encoding process should be executed.

Stage 1040 may be followed by stage 1050 of programming the at least one codeword to at least one group of flash memory cells by applying at least two state responsive programming operations, each state responsive programming operation is responsive to a state of flash memory cells.

Stage 1050 may be followed by stage 960 of updating a data structure with metadata that is indicative of a manner in which the information entity was encoded and the manner in which the at least one encoded information entity was programmed. This may assist in future read attempts of the at least one encoded information entities.

Stage 960 may be followed by stage 930, by stage 970 of receiving a request to read an information entity or by stage 910.

Stage 970 may be followed by stage 1080 of accessing the data structure, retrieving metadata and performing a state responsive read process and a decoding process that match the state responsive encoding and programming processes applied on the information entity.

Figure 11:
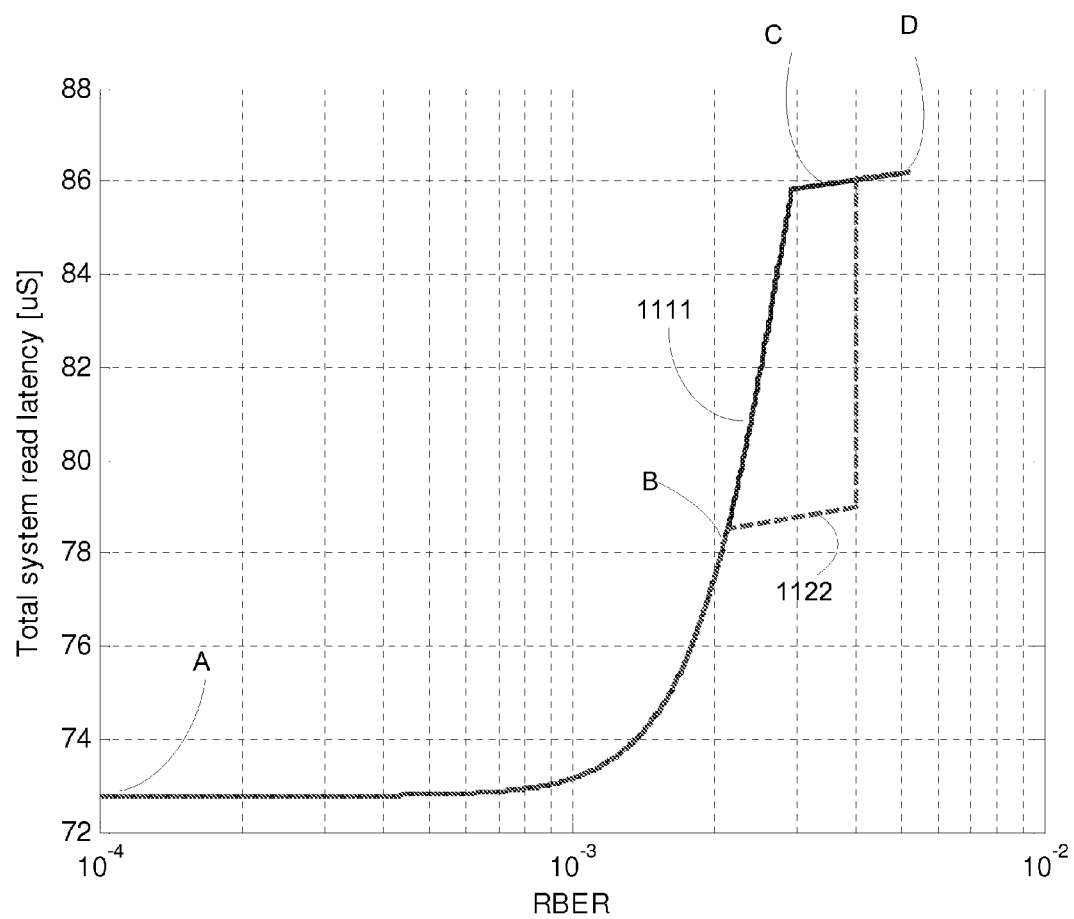
FIG. 11 illustrates the relationship between read latency and raw bit error rate according to an embodiment of the invention.

FIG. 11 demonstrates the read latency as function of the input raw bit error rate (RBER) for two coding schemes according to various embodiments of the invention.

The adaptation of a codeword length as function of the wear state can be combined with partial decoding capabilities of an ECC system.

For example, curve 1111 illustrates the relationship between the read latency ("total system read latency") and RBER for a coding rate of 0.9, codewords are 4 KB long and partial decoding is applied.

Partial decoding means that for every 1 KB read, only the relevant 1 KB data and redundancy are read from the memory (high throughput). Only when 1 KB decoding fails the rest of the 3 KB and redundancy are readout from the memory and decoding of the required 1 KB is done via the 4 KB codeword.

Curve 1122 illustrates the relationship between the read latency ("total system read latency") and RBER for a coding rate of 0.9, when the coding scheme is adaptive 2 KB which changes as RBER grows to 4 KB.

The curve 1111 and 1122 overlap between points A and B and between points C and differ from each other between points B and C. Points A, B, C, D corresponds to RBER values of 0.0001, 0.01, 0.03 and 0.04 respectively.

As may be noticed the average latency that can be achieved with 1 KB partial of 2 KB, and then 2 KB codewords, changed only later to 4 KB is much lower than 4 KB only.

According to an embodiment of the invention the method may include using analog equalization (setting Flash programming parameters as to approximate equal the bit error rates for different page types) together with a single, maybe short codeword codes, for low wear states—this approach yields maximal read/write throughput.

On relatively high wear levels, the method may use interleaving, programming parameters which provide nearly equal BER for every threshold (which yields different BERs for different page types). These programming parameters also provide finer programming accuracy, at higher SNR. Together with this use a different encoding scheme per page type, and maybe per Flash physical row, such that the coding rate is matched to the expected BER at the full retention per page. —this approach yields maximal reliability at the expense of throughput as device ages.

It is noted that the change in the coding scheme may be intended for increasing the reliability capability without changing the capacity of the Flash device. That is, variable rate encoding uses smaller redundancy for MSB pages and larger redundancy for LSB pages, while using the same redundancy in total.

There can be provided a combination of long codewords with partial decoding capabilities for increased read throughput.

According to an embodiment of the invention the operation of the management and host interface module 116 may be responsive to the state responsive operations (state responsive encoding, state responsive programming and state responsive interleaving). For example, when the data sent by the host to the storage device is not aligned to the programmable page size and codeword, some additional buffering on the flash may be required to store the extra information, beyond the encoded payload size. This data is stored until the next write transaction is performed by the host and may be aggregated to the buffered data and stored on its final destination in the flash memory. Such buffering may amplify the actual number of Program Erase cycles and is referred to as Write Amplification (WA).

It should be noted that when the encoded payload is aligned to the host payloads (say 4 KB, 8 KB, 16 KB or 32K), the probability of requiring to buffer the data may reduce significantly, thus lowering the WA and further improving reliability. Therefore, by applying state responsive memory management in module 116, an optimization of the WA can be obtained based on the state responsive programming and encoding method. It is noted that when the codewords are aligned to the host transactions the amount of writing attempts is reduced.

According to an embodiment of the invention the encoding may include increasing redundancy size at the expense of the information size as the wear level of the flash memory cells increases. This may slightly reduce the total Flash capacity, while enabling a longer lifespan, meaning that the reliability may be maintained for more P/E cycles.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for state responsive operations relating to flash memory cells, the method comprises:
    encoding an information entity by applying a state responsive encoding process to provide at least one codeword; wherein the state responsive encoding process is responsive to a state of flash memory cells; and
    programming the at least one codeword to at least one group of flash memory cells by applying a state responsive programming process that is responsive to the state, the state being either an estimated state or an actual state;
    wherein for a low wear level of the flash memory cells the encoding comprises using short codewords and the programming comprises applying analog equalization.

2. The method according to claim 1, wherein an aggregate duration of the encoding and the programming is inversely proportional to a reliability level associated with the state.

3. The method according to claim 1, comprising selecting a length of each codeword in response to the state.

4. The method according to claim 3, wherein the length of each codeword is proportional to a wear level of the flash memory cells.

5. The method according to claim 1, comprising selecting an interleaving scheme to be applied during the state responsive programming process in response to the state.

6. The method according to claim 5, comprising selecting between a non-interleaving option, an inter-flash memory die interleaving option and an intra-flash memory die option in response to the state.

7. The method according to claim 5, comprising selecting a number of partitions of the each codeword to be interleaved based upon the state.

8. The method according to claim 1, comprising selecting a threshold voltage distribution affecting scheme in response to the state.

9. The method according to claim 8, comprising selecting an analog equalization parameter.

10. The method according to claim 1, wherein for a high wear level of the flash memory cells, the programming comprises applying interleaving and does not comprise applying analog equalization.

11. The method according to claim 10, wherein the programming comprises applying programming parameters that result in nearly equal bit error rate for each read threshold regardless of a type of programming.

12. The method according to claim 11, wherein the encoding comprises using a different encoding scheme for each page type of programming.

13. The method according to claim 1, comprising performing partial decoding.

14. The method according to claim 1, comprising changing sizes of payloads and of redundancy information as a response of the state of the flash memory cells while maintaining in relation to the flash memory cells a substantially constant ratio between an aggregate size of stored information and an aggregate size of redundancy information.

15. The method according to claim 1, wherein the flash memory cells comprise multiple sets of flash memory cells and wherein the method comprises applying the encoding of a portion of the information entity based upon a state of a set of flash memory cells that is expected to store the portion of the information entity.

16. The method according to claim 1, wherein the flash memory cells comprise multiple sets of flash memory cells and wherein the method comprises applying the programming of a portion of the information entity based upon a state of a set of flash memory cells that is expected to store the portion of the information entity.

17. The method according to claim 1, wherein the encoding comprises increasing a size of redundancy information with an increase of a wear level of the flash memory cells.

18. The method according to claim 1, comprising performing state responsive buffering in response to the state of the flash memory cells.

19. A method for state responsive operations relating to flash memory cells, the method comprises:
  encoding an information entity by applying a state responsive encoding process to provide at least one codeword; wherein the state responsive encoding process is responsive to a state of flash memory cells;
  programming the at least one codeword to at least one group of flash memory cells by applying a state responsive programming process that is responsive to the state, the state being either an estimated state or an actual state;
  selecting an interleaving scheme to be applied during the state responsive programming process in response to the state; and
  selecting between
    programming different portions of a same codeword by a same type of programming, and
    programming different portions of the same codeword by different types of programming;
  wherein the different types of programming comprise at least two out of most significant bit (MSB) programming, central significant bit (CSB) programming and least significant bit (LSB) programming.

20. A method for state responsive operations relating to flash memory cells, the method comprises:
  encoding an information entity by applying a state responsive encoding process to provide at least one codeword; wherein the state responsive encoding process is responsive to a state of flash memory cells;
  programming the at least one codeword to at least one group of flash memory cells by applying a state responsive programming process that is responsive to the state, the state being either an estimated state or an actual state;
  selecting a threshold voltage distribution affecting scheme in response to the state; and
  selecting a threshold voltage distribution affecting parameter out of a start program value, a program voltage step size and a program voltage step window.

21. The method according to claim 20, wherein for a low wear level of the flash memory cells the encoding comprises using short codewords and the programming comprises applying analog equalization.

22. A non-transitory computer readable medium that stores instructions for:
  encoding an information entity by applying a state responsive encoding process to provide at least one codeword; wherein the state responsive encoding process is responsive to a state of flash memory cells; and
  programming the at least one codeword to at least one group of flash memory cells by applying a state responsive programming process that is responsive to the state; the state being either an estimated state or an actual state;
  wherein for a low wear level of the flash memory cells the encoding comprises using short codewords and the programming comprises applying analog equalization.

23. A flash memory controller, comprising:
  an encoding circuit configured to encode an information entity by applying a state responsive encoding process to provide at least one codeword; wherein the state responsive encoding process is responsive to a state of flash memory cells; and
  a programming circuit configured to program the at least one codeword to at least one group of flash memory cells by applying a state responsive programming process that is responsive to the state; the state being either an estimated state or an actual state;
  wherein for a low wear level of the flash memory cells the encoding comprises using short codewords and the programming comprises applying analog equalization.

24. A method for state responsive programming, the method comprises programming at least one codeword to at least one group of flash memory cells by applying at least two state responsive programming operations, each state responsive programming operation is responsive to a state of flash memory cells; and selecting between (a) programming different portions of a same codeword by a same type of programming, and (b) programming different portions of the same codeword by different types of programming, wherein the different types of programming comprise at least two out of most significant bit (MSB) programming, central significant bit (CSB) programming and least significant bit (LSB) programming.

25. The method according to claim 24, comprising selecting in response to the state of the flash memory cells at least one out of a start program value, a program voltage step size and a program voltage step window.

* * * * *